(12) United States Patent
Tillman et al.

(10) Patent No.: US 9,764,217 B2
(45) Date of Patent: Sep. 19, 2017

(54) INTERACTIVE SCOREKEEPING AND ANIMATION GENERATION

(71) Applicants: Kevin M. Tillman, Scottsdale, AZ (US); Scot Gillis, Morgan Hills, CA (US)

(72) Inventors: Kevin M. Tillman, Scottsdale, AZ (US); Scot Gillis, Morgan Hills, CA (US)

(73) Assignee: EyezOnBaseball, LLC, Morgan Hill, CA (US)

( * ) Notice: Subject to any disclaimer, the term of this patent is extended or adjusted under 35 U.S.C. 154(b) by 0 days.

(21) Appl. No.: 14/022,161

(22) Filed: Sep. 9, 2013

(65) Prior Publication Data

US 2014/0139531 A1    May 22, 2014

Related U.S. Application Data

(63) Continuation of application No. 12/135,998, filed on Jun. 9, 2008, now Pat. No. 8,531,462.

(51) Int. Cl.
| | |
|---|---|
| *G06T 15/20* | (2011.01) |
| *G06T 13/40* | (2011.01) |
| *A63F 13/40* | (2014.01) |
| *A63B 71/06* | (2006.01) |
| *G06T 13/00* | (2011.01) |

(52) U.S. Cl.
CPC .......... *A63B 71/0669* (2013.01); *G06T 13/00* (2013.01); *G06T 13/40* (2013.01); *G06T 15/20* (2013.01)

(58) Field of Classification Search
CPC ....... G06T 15/20; G06T 13/40; G06T 11/001; G06T 11/60; G07F 17/32; A63D 5/04; G06F 3/04815; A63F 13/10
USPC ....... 345/427, 473, 581, 619, 629, 630, 653, 345/659; 700/91, 92; 715/848–852; 463/30–35
See application file for complete search history.

(56) References Cited

U.S. PATENT DOCUMENTS

| | | | |
|---|---|---|---|
| 6,031,545 A * | 2/2000 | Ellenby .................. | G01C 17/34 345/632 |
| 6,072,504 A * | 6/2000 | Segen .................... | G06T 7/2033 345/474 |
| 6,204,862 B1 * | 3/2001 | Barstow et al. .............. | 345/473 |
| 7,548,242 B1 * | 6/2009 | Hughes et al. ............... | 345/473 |
| 2007/0296723 A1 * | 12/2007 | Williams ....................... | 345/473 |

* cited by examiner

Primary Examiner — Ke Xiao
Assistant Examiner — Andrew Shin
(74) Attorney, Agent, or Firm — Kokka & Backus, PC

(57) ABSTRACT

Techniques for interactive scorekeeping and animation generation are described, including evaluating a play to form an event datum associated with execution of the play, using the event datum to form an event packet, generating an animation using the event packet, the animation being associated with the execution of the play, and presenting the animation on an endpoint.

19 Claims, 22 Drawing Sheets

FIG. 3G

| No. | Inning 1 | Pos. | Sub | Inning 1 | Inning n | AB | R | H | RBI | 2B | 3B | HR | K | BB | HBP | SAC | SBA | SB | PA |
|---|---|---|---|---|---|---|---|---|---|---|---|---|---|---|---|---|---|---|---|
| 2 | Darren Lewis | 3B | ▷ | 388 | 389 | | | | | | | | | | | | | | |
| 2 | Robby Thompson | 2B | ▷ | 390 | 391 | | | | | | | | | | | | | | |
| 26 | Bill Swift | 1B | ▷ | 392 | 393 | | | | | | | | | | | | | | |
| 22 | Will Clark | | ▷ | | | | | | | | | | | | | | | | |
| 9 | Matt Williams | CF | ▷ | 394 | 395 | | | | | | | | | | | | | | |
| 25 | Barry Bonds | LF | ▷ | 396 | 397 | | | | | | | | | | | | | | |

INTERACTIVE SCOREKEEPING AND ANIMATION GENERATION

CROSS-REFERENCE TO RELATED APPLICATIONS

This application is a continuation of U.S. patent application Ser. No. 12/135,998, filed Jun. 9, 2008, entitled "Interactive Scorekeeping and Animation Generation," of which is incorporated by reference herein in its entirety for all purposes.

FIELD OF THE INVENTION

The present invention relates generally to computer software applications and architecture, and electronic scorekeeping. More specifically, interactive scorekeeping and animation generation is described.

BACKGROUND OF THE INVENTION

Conventional scorekeeping has been maintained using paper-form score sheets that are populated by users either involved in a game (i.e., a sporting event, match, or other competitive event in which competing parties, groups, teams, or individuals establish a record of points against each other during the conduct (i.e., play) of a game). In some conventional approaches, the sport of amateur baseball, among others, often uses a paper or electronic score sheet to record scores and other player information including drawing a symbol onto a representation of a playing field printed on the score sheet. As used herein, the term "score" refers generally, to keeping a record of the points gained in a game. However, using conventional score sheets have drawbacks. For example, novices to the game typically find populating the score sheet to be a difficult and time-consuming task because there are many symbols to represent the outcome (i.e., result) of a play. Further, conventional score sheet input typically requires providing numerical values associated with a play causing distraction and disrupting visual observation of a play and a game. Still further, scoring using conventional score sheets provides summary information about the outcome of a play. Conventional scorekeeping solutions do not describe plays in detail, such as specific physical motion of players, environmental conditions, or other information. Conventional solutions for gathering statistics about multiple facets of a play, including performance of each player executing the play, are data-mining intensive and labor some, often requiring multiple individuals (i.e., users or persons keeping score) to populate different areas of a score sheet. Conventional solutions fail to accurately and quickly depict the conduct of a play or game for players, coaches, or other stakeholders because score sheet are used to record the outcomes, and not the conduct of a play. In other words, conventional solutions fail to capture the execution of a play during a game.

In other conventional solutions, electronic score sheets are problematic due to complex and difficult user interaction is required. Further, presentation and analysis of scorekeeping data is results-based (i.e., outcome-oriented) and has many of the above-described limitations of paper-based score sheets.

Thus, what is needed is a solution for scoring games without the limitations of conventional techniques.

BRIEF DESCRIPTION OF THE DRAWINGS

Various embodiments of the invention are disclosed in the following detailed description and the accompanying drawings:

FIG. 3G illustrates an exemplary interactive score sheet;

DETAILED DESCRIPTION

Figure 1:
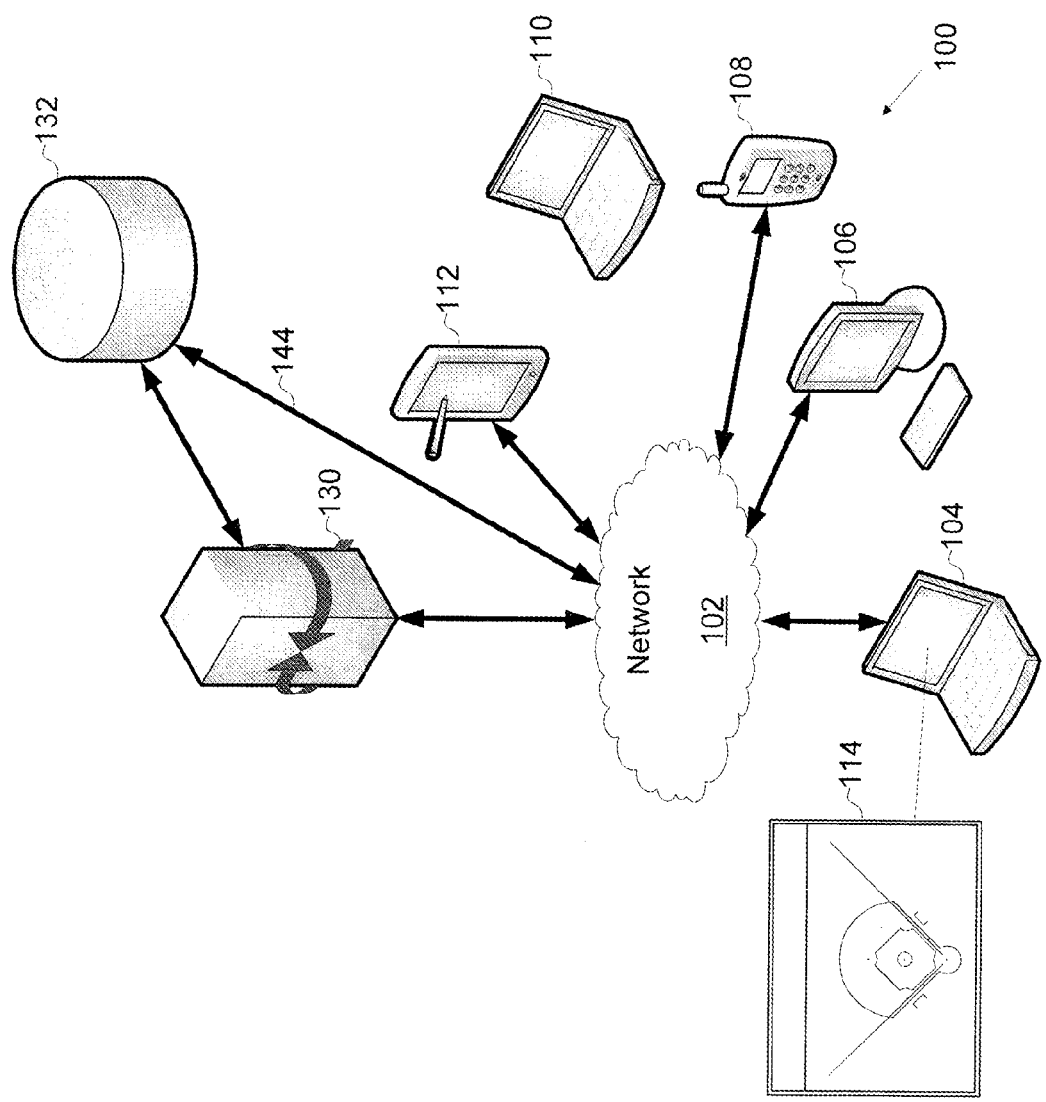
FIG. 1 illustrates an exemplary interactive scorekeeping and animation generation system.

Various embodiments of the invention may be implemented in numerous ways, including as a system, a process, an apparatus, or a series of program instructions on a computer readable medium such as a computer readable storage medium or a computer network where the program instructions are sent over optical or electronic communication links. In general, operations of disclosed processes may be performed in an arbitrary order, unless otherwise provided in the claims.

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

In some examples, the described techniques may be implemented as a computer program or application ("application") or as a module or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including C, Objective C, C++, C#, Flex™, Java™, Javascript™, Ajax, COBOL, Fortran, ADA, XML, HTML, DHTML, XHTML, HTTP, XMPP, and others. Design, publishing, and other types of applications such as Dreamweaver®, Shockwave®, Flash®, and Fireworks® may also be used to implement the described techniques. The described techniques may be varied and are not limited to the examples or descriptions provided.

Techniques for interactive scorekeeping and animation generation are described, including presenting an interface that is configured to record plays (e.g., an action or act that is performed in any type of game resulting in an outcome or result) and to produce play-related animation. In some examples, a play may be an act, event, or action while playing a game or a sport, for example, baseball, cricket, football, and others. The game of baseball has many substeps involved in executing a play, such as maneuvers performed by a player including interactions with other players or objects on the playing field. In other examples, the described techniques may include interactions with a user (e.g., scorekeeper, coach, or others) to obtain enter, analyze, filter, sort, or otherwise evaluate ("evaluate") game data before, during, or after a game. In some examples, game data may be data representing facets of the game, such as a pitch result, a play result, an offensive result, a defensive result, or others. An interaction may be an input such as a mouse click, "mouse-over" (i.e., moving an icon using an input/output device such as a computer mouse), clicking and dragging, text entry, or the like. Data input by a user may be used to determine whether to generate (i.e., render, display, or present) an animation associated with the play, results of a game, perform an evaluation to analyze game data, or other type of function. In some examples, game data may be stored in a file, which may be logical groups of data or information that may be used to instantiate an object, process, or set of objects or processes when invoked. Files may include content, data, or information such as score sheets, tables, documents, images, video, audio, multimedia elements, news articles, and the like. In other examples, various types of data or information besides game data may be used to perform the described techniques. For example, animations may be edited (or curtailed) to present portions of a game of interest to a user. In other words, a user may play back an animation sequence for a game (i.e., a continuous series of animations that make up the game) or an individual play within a game associated with a given player, team, league, or the like. Further, the described techniques may be used with various types of users (e.g., players, coaches, media reporters, spectators, or others). In other examples, the described techniques may be implemented differently and are not limited to the descriptions provided.

FIG. 1 illustrates an exemplary interactive scorekeeping and animation generation system. Here, system 100 includes network 102, clients 104-112, interactive scorekeeping and animation generation application (hereafter "scorekeeping application") 114, server 130, repository 132, and communication link 144. The number and type of clients 104-112 may be varied and are not limited to those shown. In some examples, system 100 and the included elements may be varied in number, function, design, and other characteristics, and are not limited to the examples provided. In some examples, network 102 may be the Internet, a local area network (LAN), wide area network (WAN), wireless local area network (WLAN), municipal area network (MAN), or other type of network. Data may be exchanged between client 104 and server 130, which may be in direct or indirect data communication with repository (e.g., database, storage area network (SAN), network attached storage (NAS), and others) 132. In some examples, data may be transmitted by client 104 using scorekeeping application 114 to input player activity and the results or outcome of a play ("play outcome") associated with keeping score for a game. In other examples, scorekeeping application may be used by any of clients 104-112 and others, without limitation. In some examples, a score may be presented using different media types (e.g., images, video, voice, and others) based on the play outcome and player activity being translated into animation depicting the game (or portion thereof). In other examples, data may be requested by client 104. Data may be used to provide requested content (e.g., electronic score sheets, box score, player information, game analysis, or others) to client 104 and, once presented, may include an animation (not shown) retrieved locally to client 104. In some examples, an animation may include the design, or production, generation, rendering, display, or other presentation of computer-generated images based on data associated with a play and a play outcome. In some examples, the animation may be delivered by server 130 from repository 132. In still other examples, content may be requested by one or more of clients 104-112 with storage of the animation performed locally instead by repository 132. Also, clients 104-112 may synchronize to repository 132 using, for example, server 130 or data communication link 144 (which may implemented using a direct or indirect (i.e., having intermediate connections, components, equipment, or other direct or indirectly coupled elements between repository 132 and some, all, or none of clients 104-112) connection to repository 132) to store data stored locally.

In some examples, scorekeeping application 114 may be invoked to provide an interactive tool configured to record and process data from a game to present results including animation simulating the game, as described in greater detail below. For example, an input (not shown) may be received by scorekeeping application 114 that generates a record of a play consisting of a sequence with player activity (i.e., an event involving execution of the play) that contributes to the scoring of the game. In some examples, the play may be, for example, a pitcher throwing a ball to a batter, in which the batter swings and makes contact with the ball. Here, scorekeeping application 114 may inquire about a sequence of events, such as a pitch, a hit, catch, or the like. An inquiry may include evaluating a pitch, play, offensive, or defensive result. Evaluating each result may generate a data packet, which, in some examples, may contribute to forming an animation depicting the sequence of player activity using multiple data packets. Further, scorekeeping application 114 may be configured to generate other files, such as electronic score sheets that may be populated with scoring information about the game, which may be stored at repository 132. In other examples, system 100 may be configured and implemented differently than shown and described.

Figure 2A:
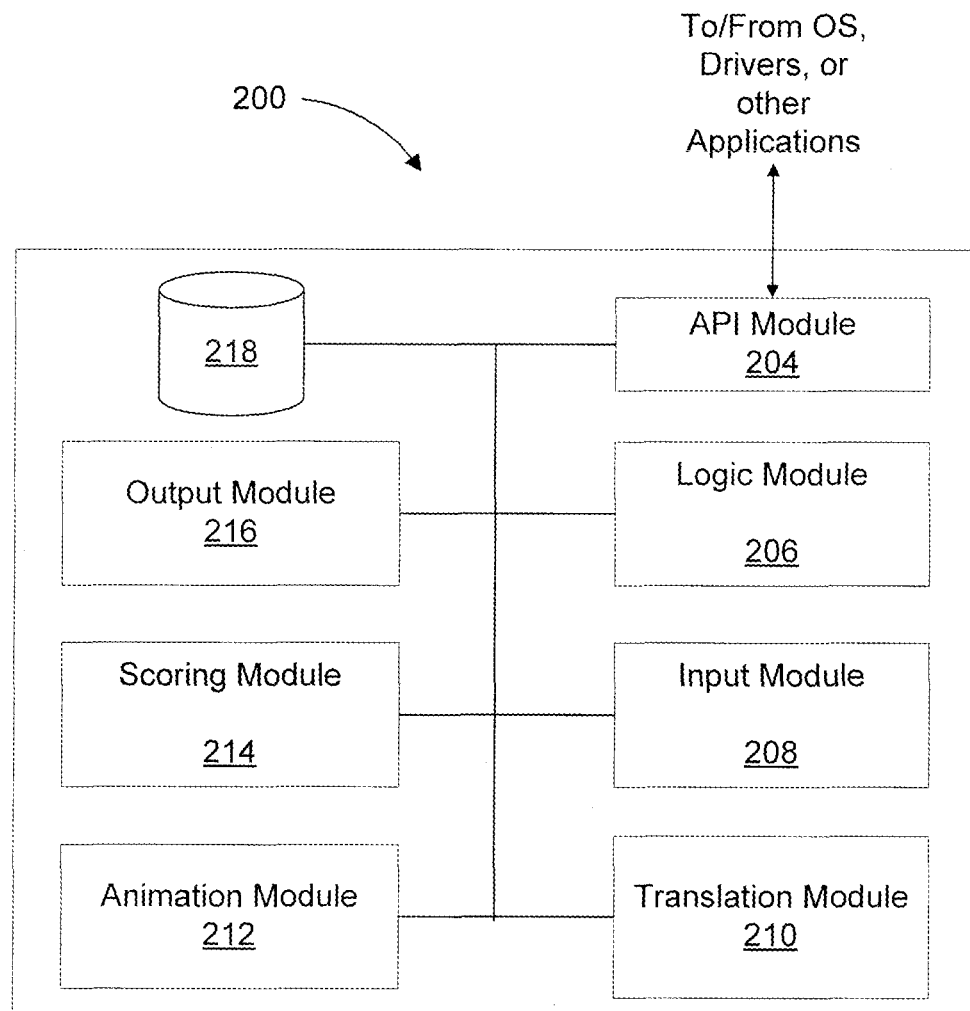
FIG. 2A illustrates an exemplary interactive scorekeeping and animation generation application architecture.

FIG. 2A illustrates an exemplary interactive scorekeeping and animation generation application architecture. Here, application 200 includes application programming interface (API) module 204, logic module 206, input module 208, data module 210, animation module 212, scoring module 214, output module 216, and repository 218. In some examples, application 200 may used to implement scorekeeping application 114 (FIG. 1). Logic module 206 may be used to provide control signals and data to one or more of application programming interface module 204, input module 208, translation module 210, animation module 212, scoring module 214, output module 216 and repository 218. Input module 208 may be configured to receive and evaluate data received over API module 204 from an operating system, application (e.g., web browser, desktop or client application, and others), port, or other source, which may be used to record scoring events and player activity from sporting games (or matches). In some examples, scoring events from a game such as baseball may include, but is not limited to, a run, a home-run, an out, a strike, a ball, a base-hit, or others. As used herein, a scoring event may generally refer, to a play, which may be an act (or instance) of playing the game. Each of these events, for example, may involve sub-processes (e.g., a relay play between a defensive player and another defensive player after a base-hit), which may generate multiple animations in sequence. In other words, each sub-step may be translated into a frame depicting the instance, and the collection of the frames may generate a movie simulating the game (or portion thereof). In other examples, player activity may be motions (or actions) performed by a player (or multiple players) in the game while executing the play (i.e., a scoring event). In some examples, player activity may contribute to the depiction of the event, play, or the like.

Here, data transferred over API module 204 may be used by application 200 to support requests for services by, for example, scorekeeping application 114 (FIG. 1). API module 204 may be used to transfer data between application 200 and modules 206-218 and other sources or destinations (e.g., an operating system, another application, port, or other source/destination). In some examples, requests may be determined based on input provided by the entry of data associated with a game ("game data") or play ("play data"). For example, a user on client 104 (FIG. 1) may request to enter game data associated with a pitch result with properties, such as pitch type, pitching speed, pitch location, and others. In some examples, game data may include other facets of the game such as offensive plays (e.g., batting, running), defensive plays (e.g., fielding), and scoring plays. In other examples, requests may be used to retrieve game data, which may be determined, based on input provided to request access to, for example, repository 218. In some examples, requests may be used to provide services for, submitting game data or play data, reviewing scores, watching animations generated from game or play, and others.

Here, translation module 210 may be used by application 200 to parse incoming data from API module 204 and to evaluate an identifier (or tag) associated with an animation. For example, incoming game or play data may include content-related tags that may be searched, decoded, retrieved, or otherwise modified to generate animations associated with the content. In some examples, a formatting language such as, for example, extensible markup language ("XML") may be used to format game or play data for use when processing XML-based data to generate animations locally (or remotely) by having a tag embedded in the incoming game or play data, and using the tag to identify or mark ("mark") an animation that depicts the content (i.e., an amount of information about a play in the game) associated with a given tag. In some examples, marking an animation may be performed to identify a specific frame (or multiple frames) of animation, and compile successively, identified frames in order to generate (i.e., build) an animation sequence. In some examples, the tag may be located, in some examples, within a header (not shown) of the incoming game or play data. In other examples, the tag may be combined with other data found in a payload section of incoming game or play data. In still other examples, translation module 210 may be in data communication with an adaptor (not shown) configured to facilitate translation of web languages (e.g., HTML (i.e., hyper text markup language), DHTML (i.e., dynamic hypertext markup language), XML, XSL (i.e., extensible style sheet language), WSDL (i.e., web services delivery language), and others).

Here, animation module 212 may be used by application 200 to render data from one or more of API module 204, logic module 206, input module 208, translation module 210, scoring module 214, and other modules. In some examples, animation module 212 may be an animation engine configured to process game, play, or other types of data to generate an animation (i.e., an animated visual media (e.g., a 3-dimensional animation) configured to present a game (or portion thereof) and/or plays (i.e., a display of motions from player avatars (i.e., graphical depictions of characters associated with players, coaches, participants, or others affiliated with a game or play)). In some examples, a player avatar may be a graphical image that represents a person participating in a game being scored. Also, animations may present a game environment or context-appropriate background, depending upon the type of game being played (e.g., a football stadium, a baseball stadium, a cricket field, a polo ground, a water polo aquatic stadium, a rifle range, a racetrack, and others), including but not limited to, a baseball field, an audience, a venue setting, weather elements, and others. In some examples, animation module 212 may be configured to process and generate media (e.g., images, video, voice, and others) to provide visual representations (i.e., animations) of game or play data being recorded (i.e., input). In some examples, animations may be configured to present three-dimensional images using color and lighting properties to provide a realistic picture. In other examples, animation module 212 may be connected to input module 208 to provide an interaction that may modify settings (or properties) about an animation (e.g., player avatar attributes or characteristics, game environmental conditions, and others). For example, elements such as team uniforms, physical features, player performance levels, and others may present the animation differently. Further, animation module 212 may provide control of how animations may be presented, such as modifying viewing angles for presentation on, for example, client 104 (FIG. 1), for example, setting a viewing angle in the third ($3^{rd}$) person. In other examples, animation module 212 may be configured to connect to a graphics card (not shown) using API module 204, and support the conversion of game, play, or other data to animations.

Further, scoring module 214 may be used by application 200 to provide management of scoring a game. Baseball, for example, has many sub-steps in scoring each play, which may include recording multiple events and motions. In some examples, scoring module 214 may provide inquiries about a score using scorekeeping application 114 (FIG. 1) that captures a situation of a game (or portion thereof), including but not limited to, a fielding play, a running play, a batting play, a motion by a player while executing the play, a result of the play, and others. In some examples, an inquiry may be an instance of questioning that involves evaluating the outcome of a game or play and a resulting score. In some examples, scoring module 214 may be configured to translate a game or play into quantitative (e.g., statistical) or qualitative (e.g., subjective) data that may be used for evaluation. Also, scoring module 214 may be configured to translate an entry of game or play data into a symbol (or notation) that may be used for generating output data (i.e., data resulting from the performance of an evaluation).

Here, output module 216 may be used by application 200 to provide output (i.e., data or information associated with a game or play). In some examples, output module 216 may be configured to present generated computer-generated images (i.e., animations) and content related to the scoring of a game. In some examples, output module 216 may process game or play data from one or more of input module 208, translation module 210, animation module 212, or scoring module 214. For example, output module 216 may be connected to a display (not shown) configured to present user interface generated by scorekeeping application 114 (FIG. 1) using the described techniques. In other examples, output module 216 may be in data communication with modules 204-212 to provide generated reports, including but not limited to, score sheets, box scores, charts, graphs, player pages, team pages, league pages, animation metadata, and others.

In some examples, repository 218 may be implemented using a database configured for local or remote access, data bank, data mart, data warehouse, storage area network (SAN), network attached storage (NAS), redundant array of independent drives or disks (RAID), or any other type of storage facility configured to store data that may be accessed by application 200. For example, data associated with interactive scorekeeping and animation generation may be stored in repository 218. As another example, data used to generate reports by output module 216 and scoring module 214 may be stored in and accessed from repository 218. In other examples, repository 218 may be a repository or other type of storage facility configured for remote access, as described below in connection with FIG. 2B. Here, repository 218 may be in data communication with other sources (e.g., electronic devices, web portal, and the like) using API module 204 across network 102 (FIG. 1) to request access to game or play data. In other examples, application 200 may be implemented differently and may also vary in architecture, function, design, operation, or other attributes.

Figure 2B:
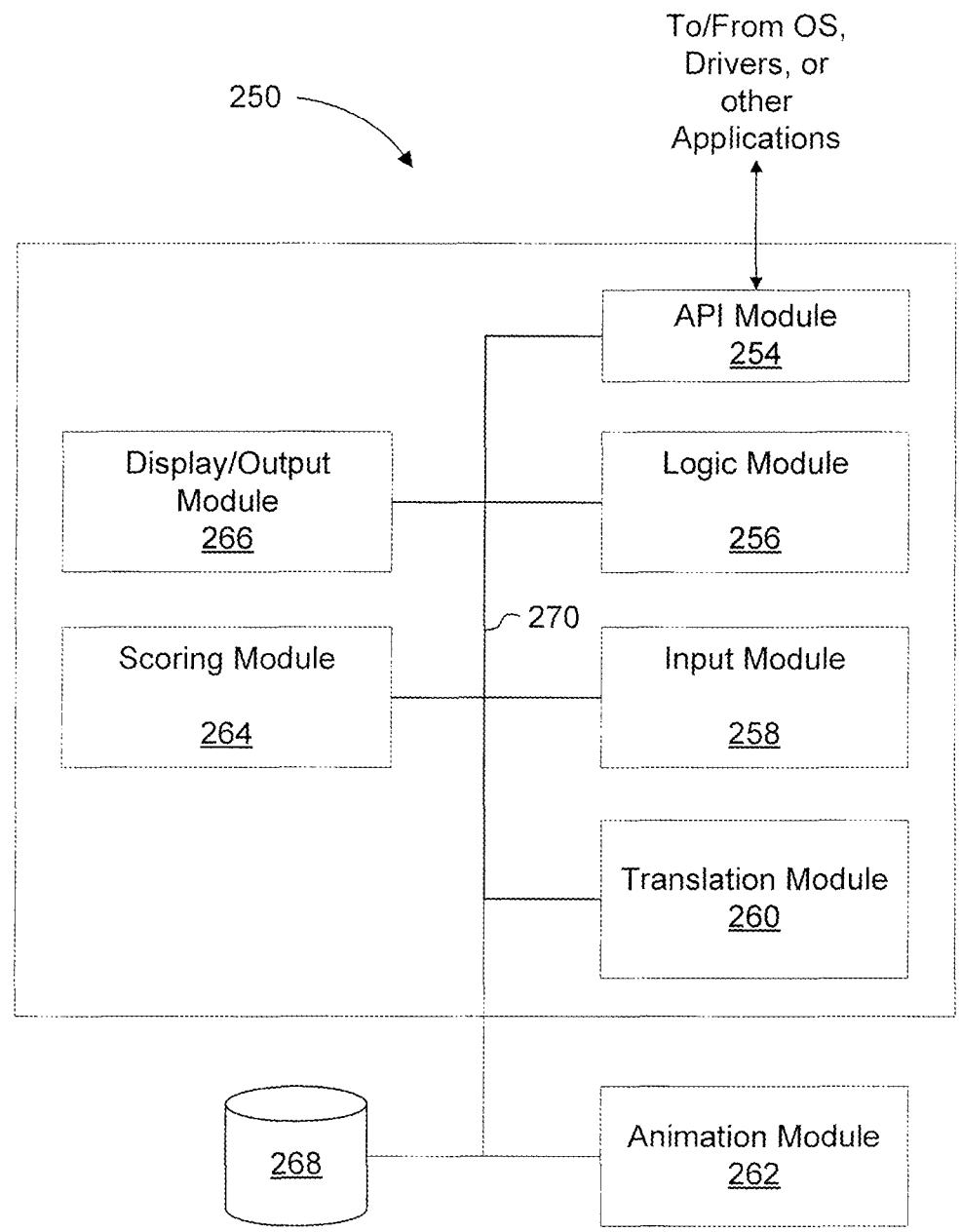
FIG. 2B illustrates an alternative exemplary interactive scorekeeping and animation generation application architecture.

FIG. 2B illustrates an alternative exemplary interactive scorekeeping and animation generation application architecture. Here, application 250 includes application programming interface (API) 254, logic module 256, input module 258, data module 260, animation module 262, scoring module 264, output module 266, and repository 268. In some examples, one or more of logic module 256, translation module 260, animation module 262, scoring module 264, and repository 268 may be implemented externally to application 250, which may be an interactive scorekeeping and generation animation application, such as those described herein. For example, animation module 262 and repository 268 are shown external to application 250. Animation module 262 and repository 268 may be implemented using other applications that configured to provide visual forms of scorekeeping and storage capacity, respectively. In other examples, different modules apart from those shown may be implemented internally or externally to application 250.

Figure 3A:
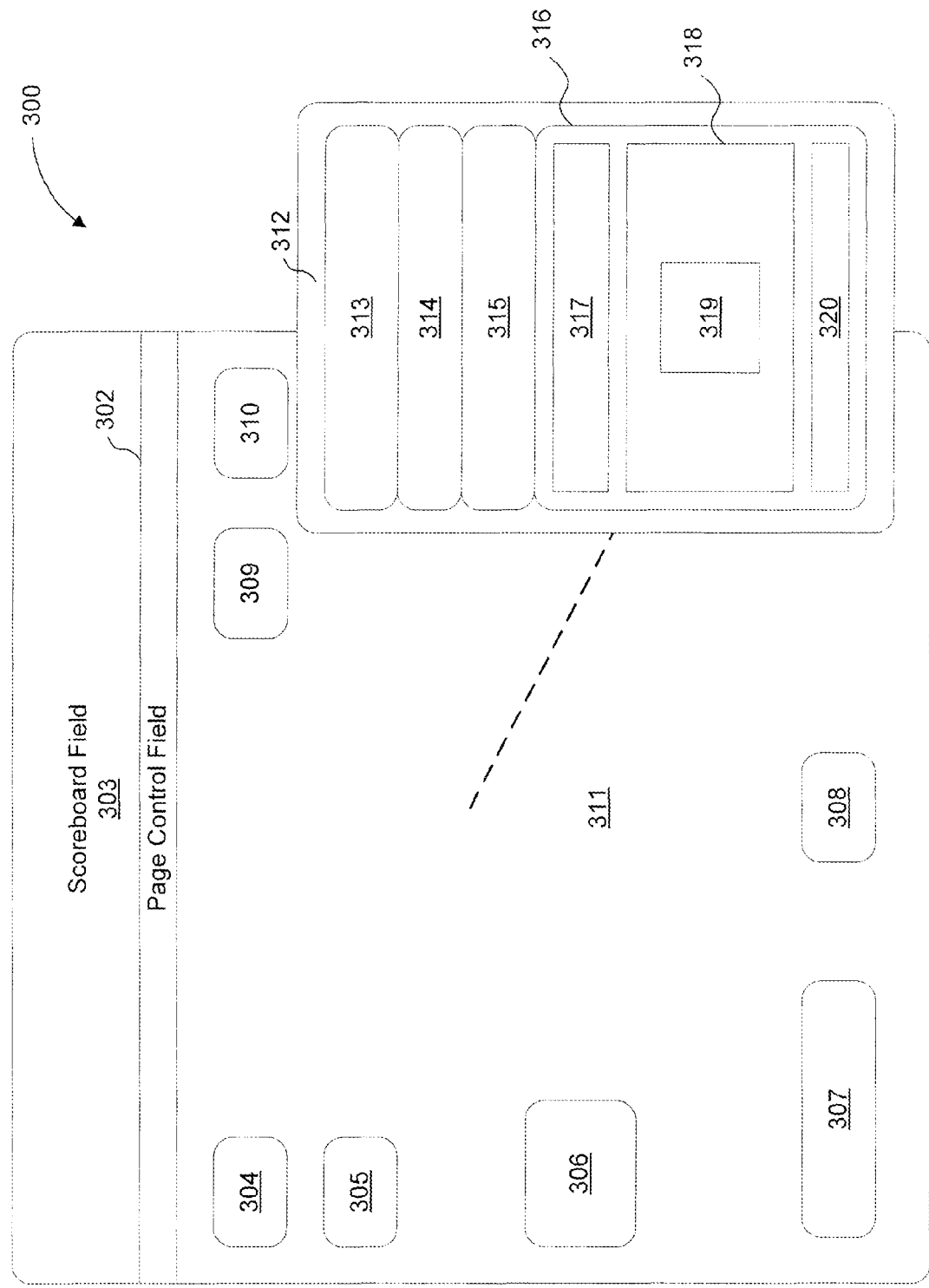
FIG. 3A illustrates an exemplary interactive scorekeeping and animation generation user interface.

FIG. 3A illustrates an exemplary interactive scorekeeping and animation generation user interface. Here, interface 300 includes page control field 302, scoreboard field 303, animation output 304, pitching output 305, inning status 306, navigation panel 307, pitcher input 308, runner input 309, runner status 310, background 311, play form 312, player input field 313, pitch result input field 314, play result input field 315, pitch locator form 316, pitch type input field 317, pitch ball input field 318, pitch strike input field 319, and pitch ground input field 320. In some examples, interface 300 and the elements shown may be configured to receive input from a user (e.g., a score, play result, play details, team information, player information, and others). Interface 300 may be configured to receive input (e.g., a mouse click, a mouse-over, field selection, "click-and-drag" selection, selection of an option from a pull or drop down menu, or others) and present options (e.g., iconic representations of choices that may be selected by a user) for selection when entering game or play data, from which to generate animations. In some examples, interface 300 may include background 311, page control field 302, and scoreboard field 303 to provide another area (e.g., player input field 313, pitch result input field 314, play result input field 315, pitch type input field 317, pitch ball input field 318, pitch strike input field 319, pitch ground input field 320, and others) configured to receive input from a user or to present information or data. For example, interface 300 may be configured to provide information about a game to a user, such as providing a score, which may be presented using scoreboard field 303. Further, scoreboard field 303 may be presented on an interface using various techniques to display a score associated with a game or play, for example, by presenting the score for each inning. In other words, a baseball game may include recording the number of runs scored per inning played, and scoreboard field 303 may display a tally for competing teams. In other examples, scoreboard field 303 may present other information related to the score, such as the total number of hits and the number of errors performed by either team. Page control field 302 may be configured to provide a user with control over forms (e.g., 312, 316, or others) that are used to access different content (e.g., a website, a team page, a statistical page, a schedule page, a league page, a charts page, or others). As used herein, the term "form" refers generally, to a page maintained on the internet with content related to interface 300.

In some examples, forms may include content based on playing, for example, baseball, cricket, football, or other games. In some examples, page control field 302 may be also configured to change content presented on background 311. Further, background 311, in some examples, may be configured to present functionality such as controls responsible for recording data from a game and presenting the game (or portion thereof) using animation.

In some examples, interface 300 may present play form 312 that may be configured to present fields (e.g., player input field 313, pitch result input field 314, play result input field 315, pitch type input field 317, pitch ball input field 318, pitch strike input field 319, and pitch ground input field 320, and others) related to plays performed in a game. Each of player input field 313, pitch result input field 314, play result input field 315, pitch type input field 317, pitch ball input field 318, pitch strike input field 319, and pitch ground input field 320 may be configured to receive user input associated with a game or play and the conduct of these plays. Input user data may be used to generate animations.

In some examples, play form 312 may be configured to be presented on background 311 or elsewhere on interface 300.

In other examples, play form 312 may be removed from presentation on background 311 using one or more of controls (not shown), and displayed elsewhere. For example, play form 312 may present fields (e.g., player input field 313, pitch result input field 314, play result input field 315, pitch type input field 317, pitch ball input field 318, pitch strike input field 319, and pitch ground input field 320, and others) configured to receive data or information about a player, pitch result, play result, pitch location, or other aspect of a play. In other examples, player input field 313, pitch result input field 314, play result input field 315, pitch type input field 317, pitch ball input field 318, pitch strike input field 319, and pitch ground input field 320, or other fields may be presented differently than as described above. In some examples, play form 312 may be configured to receive data or information (e.g., statistics) about a player, coach, or other participant using, for example, player input field 313. Player input field 313 may be configured to receive data or information about a player. In some examples, data or information associated with a player (i.e., "player data") may be entered prior to scoring a game using player input field 313. Further, player input field 313 may be configured to present player information such as a uniform number, player name, position, or others. In other examples, play form 312 may be configured to present pitch result input field 314, which may be configured to receive data or information about a resulting event, for example, after a pitch has been thrown in a game, and the resulting event being a strike or a ball. In some examples, pitch result input field 314 may record information about a strike, such as whether the batter swung and missed the ball (e.g., a swinging strike) or the batter did not swing and a strike was called (i.e., a called strike). In other examples, pitch result input field 314 may be configured to receive data or information about a ball, strike, or pitch. In still other examples, pitch locator form 316 may be configured to receive data or information using pitch result input field 314 to determine whether to record a pitch as a strike or a ball. In some examples, pitch locator form 316 may have three separate inputs, such as pitch strike input 319, pitch ball input field 318, and pitch ground input field 320. Also, pitch locator form 316 may be used to enter the type of pitch thrown. For example, there may be several types of pitches, including but not limited to, fastballs, curveballs, breaking balls, or others, which may be identified using pitch type input field 317. In other examples, there may be an input field provided on play form 312 to record the properties of each type of pitch, as described above. For example, a fastball may be recorded as a "split-finger," "a two-seam," "a four-seam," or others. Detailed information may be input using interface 300, providing users with the ability to generate and view animations that accurately portray the conduct of a play or game. In still other examples, pitch type input field 317 may present an icon (e.g., a baseball (not shown)) to represent different types of pitches being recorded. Icons presented in pitch type input field 317 may be configured for selection by a user and, once selected, used to identify a given parameter for use when generating an animation. In some examples, the types of pitches available may be determined based on entering a position of a player (e.g., pitcher (i.e., fielding position 1), and others) using pitch type input field 317. Further, pitch locator form 316 may be used to input data associated with an interaction to move, for example, an icon (e.g., a baseball icon) from pitch type input field 317 to pitch strike input field 319, pitch ball input field 318, or pitch ground input field 320. In some examples, an icon (not shown) may be moved from pitch type input field 317 to pitch strike input field 319 to record a strike and, based on the location of where the icon is relocated, describe how the strike was determined. In other words, an icon may be "clicked and dragged" from pitch type input field 317 and dragged to pitch strike input field 319. When placed within pitch strike input field 319, coordinates for the location of an icon are used to determine whether the ball was thrown to the left, right, or center of home plate, for example. Likewise, pitch ground input field 320 may record a pitch that hit the ground surface in a game, being recorded as a ball. In other words, a pitch hitting the ground may be recorded as a strike or a ball using the techniques described above. Thus, recording data or information associated with details such as the type, manner, pitcher, or result of a given pitch may be used to generate detailed animations that visually and graphically depict these events.

In some examples, interface 300 may present one or more controls configured to provide functionality that may be used to record game data and present animations associated with a game or play. For example, animation output 304 may provide playback control of an animation. In other examples, interface 300 may present pitching output 305, which may be configured as a control for determining access to data or information about a pitcher. In some examples, pitching output 305, when selected, may be used to control the output of quantitative (e.g., statistical) or qualitative (e.g., subjective) data about the pitches thrown by each pitcher. Inning status 306 may be configured to present qualitative information about the current inning being scored, for example, tracking the number of balls, strikes, and outs for a given inning. Also, navigation panel 307 may be configured to provide controls for displaying, viewing, presenting, or otherwise accessing different forms presented on interface 300. Examples of different forms that may be presented are those used to enter data or information associated with pitching, defense, running, scoring, or others. In other examples, navigation panel 307 may be configured to provide navigational controls to access other forms not described above. In some examples, pitcher input 308 may be a control that transmits data or information provided in pitch locator form 316 either locally (or remotely). In other examples, interface 300 may present runner input 309, which may be configured to enter data or information associated with recording events associated with a runner on base (e.g., a player gets on base after hitting a ball). For example, a runner may be called out (e.g., getting tagged out, reaching a base considered out, or others) or called to advance base (i.e., another hit or pitch advances the runner to the next base). As another example, runner status 310 may be a control feature presented on interface 300 that is configured to present an icon representing a current state of runners on base (e.g., a baseball diamond showing highlighted bases where runners are located during a given inning). In other examples, runner status 310 may be updated using play result input 314. Other features, functions, controls, input fields, or the like may be implemented with interface 300 and are not limited to the techniques described. Further, interface 300 and the above-described elements may vary in architecture, function, design, operation, implementation, or other attributes.

Figure 3B:
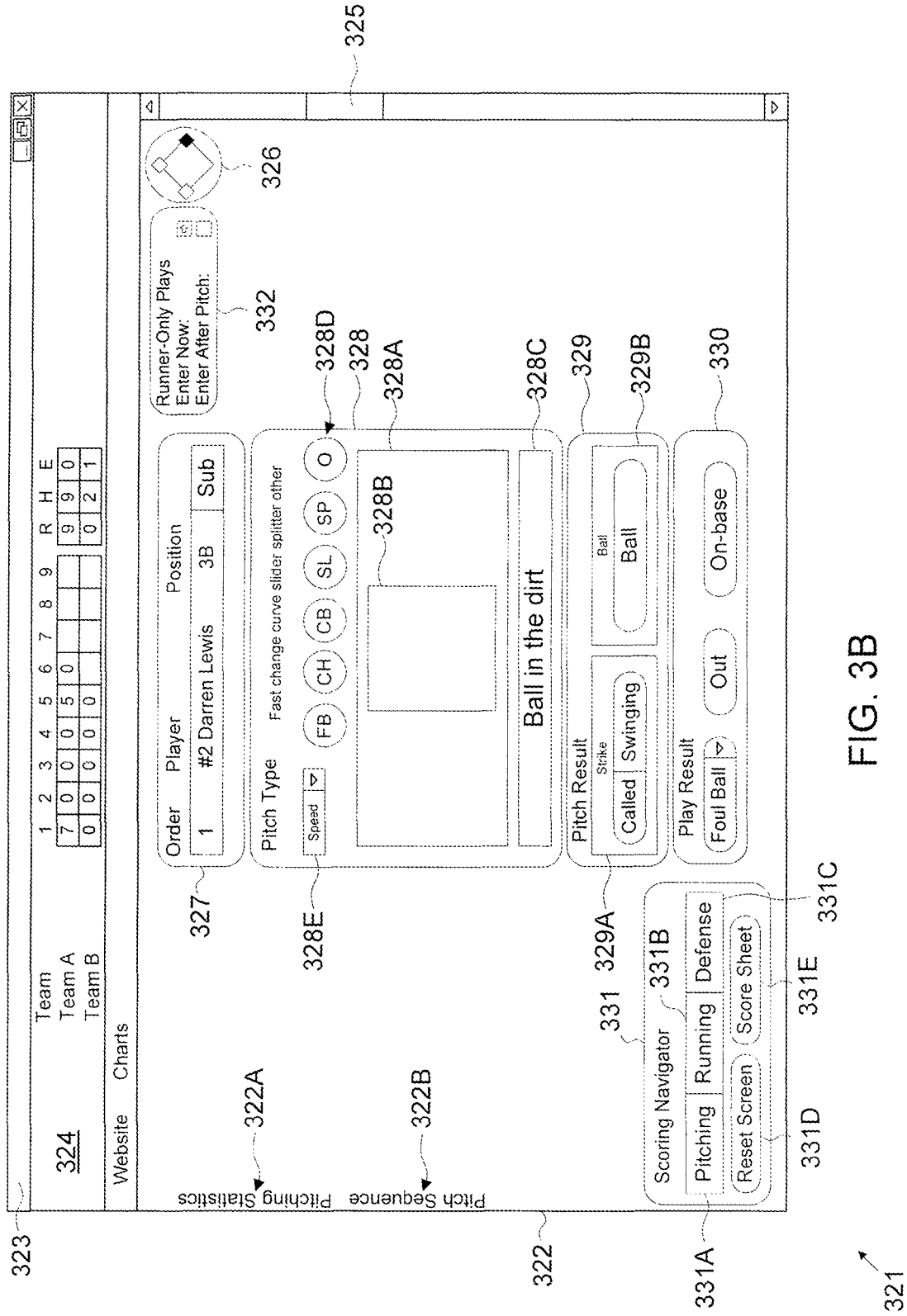
FIG. 3B illustrates an alternative exemplary interactive scorekeeping and animation generation user interface.

FIG. 3B illustrates an alternative exemplary interactive scorekeeping and animation generation user interface. Here, interface 321 includes window 322, control bar 323, region 324, vertical scroll bar 325, base status icon 326, batting order panel 327, pitch type panel 328, pitch result panel 329, play result panel 330, and scoring navigator 331. The number, size, configuration, layout, design, and placement of elements (e.g., order panel 327, pitch type panel 328, pitch result panel 329, play result 330, and others) may be varied and are not limited to the examples shown and described.

In some examples, window 322 may be configured to present various types of information including pitch sequence 322B and pitching statistics 322A. As an example, when a pointer, cursor, or other user input/output ("I/O") device is used to interface with the text for pitch sequence 322B or pitching statistics 322A, sub-windows (not shown) may be opened. A sub-window configured to present pitching statistics 322A may present various types or categories or statistics associated with a given pitcher. Further, a sub-window configured to present data associated with pitch sequence 322B may be opened, providing graphical, textual, or other types of data presentation associated with the sequences of pitches performed by a given pitcher against a batter (e.g., slow ball over the center of the plate, a fast ball to the outside, a curve-ball resulting in a strike out, and others). In other examples, the above-described presentation, formatting, layout, or design of data presented for pitching statistics 322A and/or pitch sequence 322B may be varied and are not limited to the examples provided.

Control bar 323, in some examples, may be configured to present interface controls that may be used to close, minimize, restore downwards or upwards, among others. Further, region 324 may be configured to present data associated with teams engaged in athletic competition. For example, two baseball teams (i.e., Team A and Team B), statistics, scores listed by inning, runs, hits, and errors may be presented in region 324. In other examples, different types of data may be presented and are not limited to the examples shown and described.

In some examples, batting order panel 327, pitch type panel 328, pitch result panel 329, and play result panel 330 may be presented. Batting order panel 327 may be configured to present the player number, name, and position associated with a given batter (i.e., player). Further, substitute batters (i.e., players, hitters, and the like) may also be presented in batting order panel 327. In other examples, the type, layout, configuration, and design of information or data presented in batting order panel 327 may be configured and are not limited to the examples provided.

Pitch type panel 328 may be configured, in some examples, to provide an interface for entering data or information associated with a given pitch type (e.g., pitch window 328A, strike zone 328B, ball status window 328C, type of pitch (e.g., fast ball, change ball, curve ball, slider, splitter, and others) 328D, speed 328E, or others). In other examples, different types of data may be presented in pitch type panel 328 and are not limited to the examples shown and described.

In some examples, pitch result panel 329 may be configured to present data or information associated with a strike or ball resulting from a pitch. For example, if a pitch results in a strike, data may be entered in strike window 329A (e.g., called strike, swinging strike, and others). Further, when a button (e.g., "Swinging") is selected in strike window 329A, a further drop-down or other type of menu may be presented that allows the entry of specific types of swinging strikes (e.g., normal strike out, strike out, dropped, and others). Alternatively, if a ball results from a pitch, a corresponding input may be entered in ball window 329B. In other examples, the types, configurations, layouts, designs, and configuration of data presented in ball window 329B may be varied and are not limited to those shown and described.

Play result panel 330 may be configured, in some examples, to present information or data associated with the outcome of a play. For example, buttons may be presented that are configured to allow entry of a foul ball, out, or an on-base determination (i.e., a batter successfully lands on first base, second base, third base, or a home run as a result of a given play, as described by entry of data entered into batting order panel 327, pitch type panel 328, and pitch result panel 329. In other examples, the types of data, configuration, layout, design, or format of data or information presented in play result panel 330 may be varied and are not limited to the descriptions provided.

Scoring navigator 331B may be configured, in some examples, for use to manipulate interface 322, which is configured to implement the techniques and logic described herein for interactive scorekeeping. Here, buttons 331A-331E may be presented to allow the selection of a given set of functionality in interface 322. For example, if button 331B is selected, interface 322 may be modified to present screens, forms, fields, or other windows that may be configured to enter data or information associated with running plays in a game. Likewise, pitching and defense interfaces may be presented if buttons 331A or 331C are selected, respectively. Alternatively, the data fields presented in interface 322 may be reset (i.e., cleared and returned to an initial state) by selecting button 331D (i.e., "Reset Screen"). Further, button 331E may be selected to invoke an interactive score sheet, as described in further detail below in connection with FIG. 3G. An overall status of the number of runners on bases may be presented using icon 326, which provides a summary-level view of the status of a given inning. Further, window 332 may be presented to provide the entry of data or information associated with runner-only plays (i.e., plays that are neither connected to, involved with, or resulting from a pitch). By selecting an option to "enter now" or "enter after pitch," window 332 provides a sub-interface to enter data or information associated with runner-only plays using various techniques without limitation.

Figure 3C:
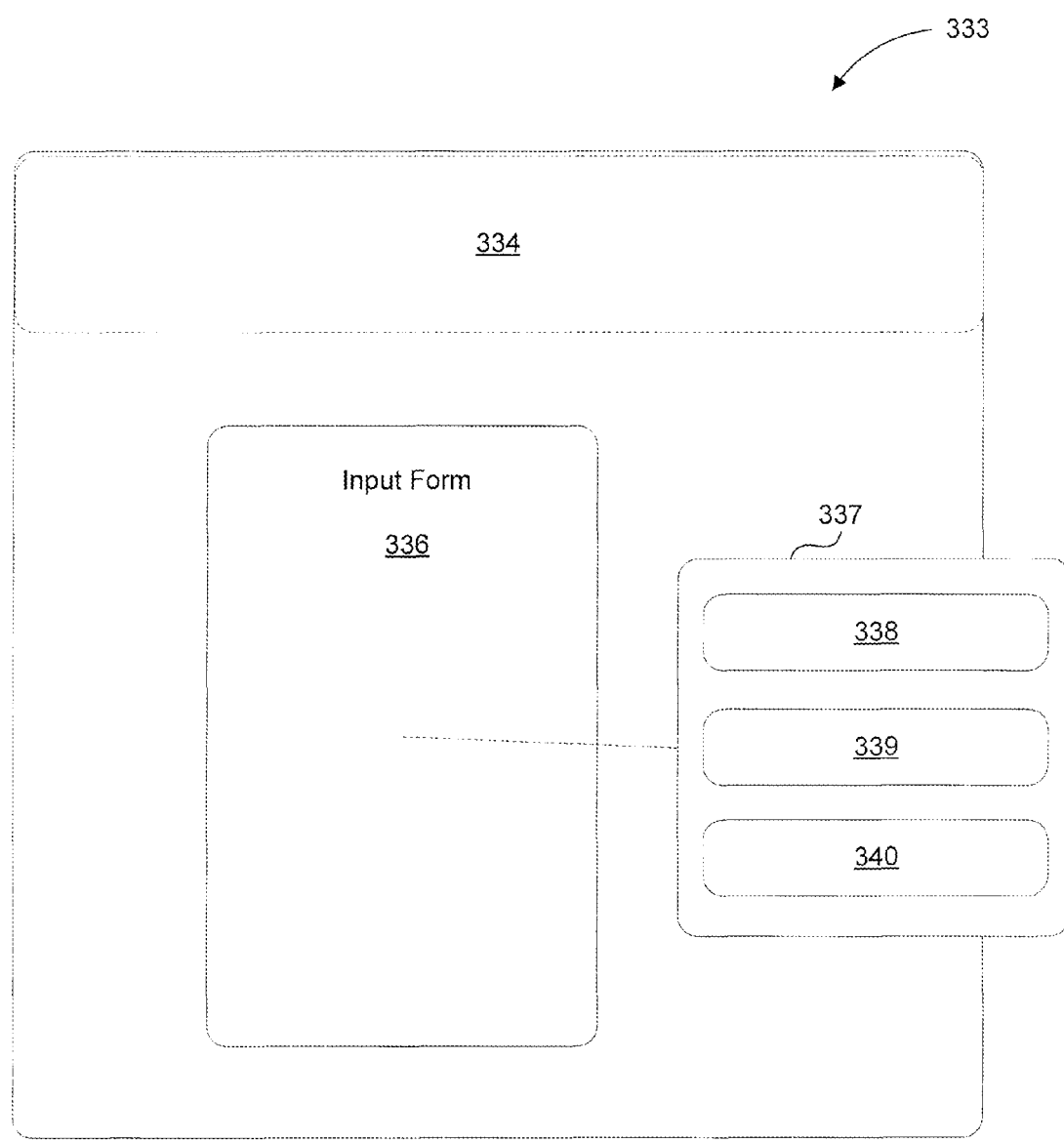
FIG. 3C illustrates an exemplary interactive scorekeeping and animation generation user interface.

FIG. 3C illustrates an exemplary interactive scorekeeping and animation generation user interface. Here, display 333 includes input form 336, hitting input form 337, hit category 338, hit type 339, and other result 340. In some examples, display 333 may be configured as an interface to receive an input associated with scoring of hitting plays. For example, input form 336 may provide hitting input form 337 to record information about a hit from a batter. Also, there may be an input provided to play result 315 (FIG. 3A) that describes an event involving a hit, which may be recorded in greater detail by hitting input form 337. In some examples, hitting input form 337 may record data describing whether a hit is a single, double, triple, or homerun by using category input 338. Also, each hit may be recorded based on the type of hit (i.e., how the hit traveled across the field). For example, a hit may be recorded as a "single" when designated using category input 338. Further, a hit may be described as a "line drive" by selecting an option (e.g., "line drive" may be designated in text, graphics, visual, iconic, or other forms of representation and is not limited to the examples provided) in hit type 339. Further, there may be a sequence of events following a hit that are uncommon. For example, a fielder's choice play, advancing to base on a throw, advancing to base on an error, or others, which may be recorded by other result 340. In some examples, display 334 may include field 334, which may be configured to present a scoreboard and controls to other forms, in connection with, page control field 302 (FIG. 3A).

Figure 3D:
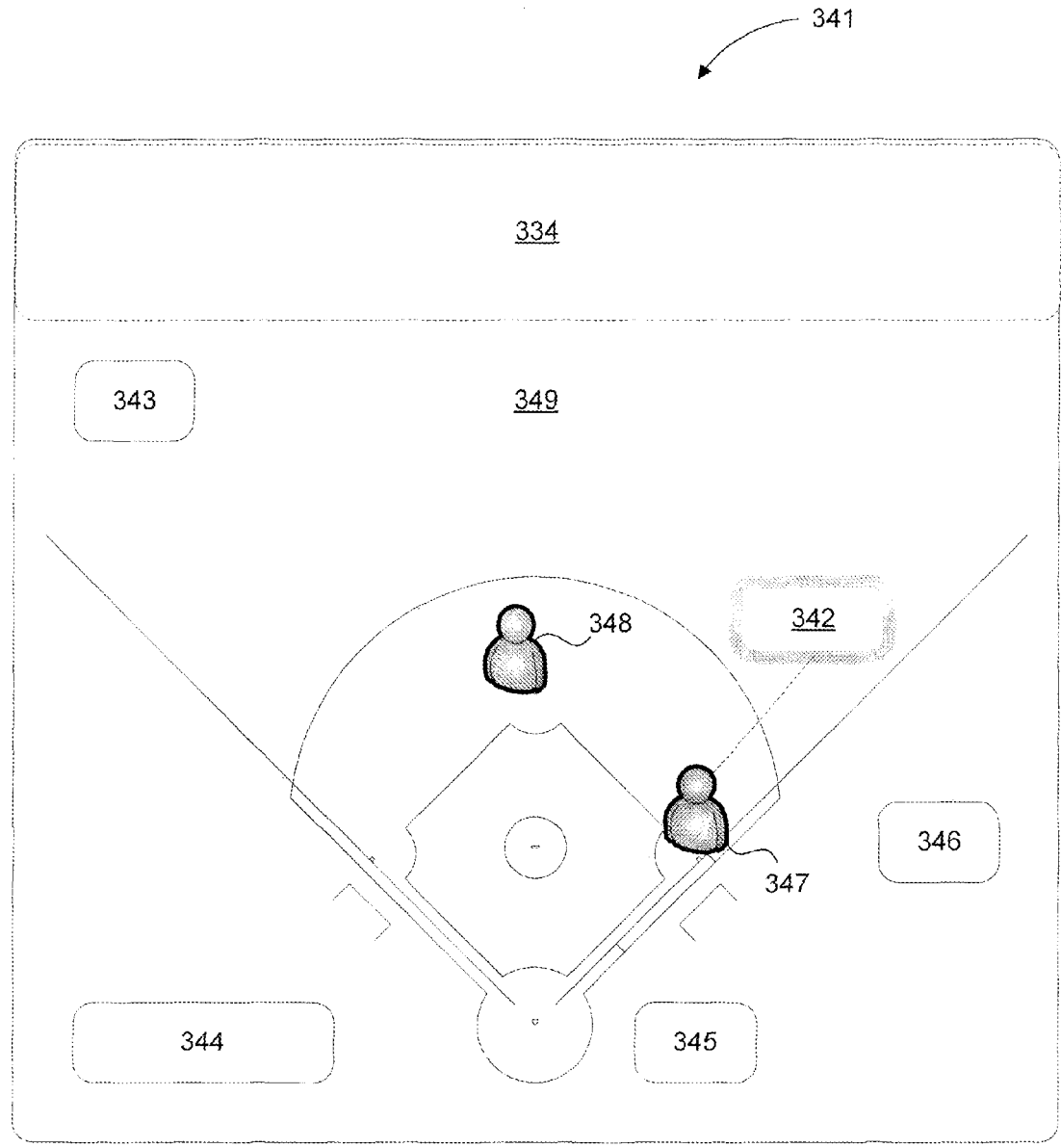
FIG. 3D illustrates an exemplary interactive scorekeeping and animation generation user interface.

FIG. 3D illustrates an exemplary interactive scorekeeping and animation generation user interface. Here, display 341 includes window 342, control 343, navigation panel 344, runner input 345, runner control 346, base-runner icon 347, base-runner icon 348, and background 349. In some examples, display 341 may be configured as an interface to receive an input associated with scoring running plays. For example, display 341 may be configured to receive interactive input (i.e., using an input/output device such as a keyboard, mouse, voice command, haptic, or other type of user interface control) from a user to add, subtract, or update a position of a runner on a field (e.g., background 349). In some examples, background 349 may be configured to present a field on which one or more of base-runner icons 347-348 may be presented. In some examples, display 341 may receive an input from play result 314 (FIG. 3A) or hitting input form 337 (FIG. 3C) to provide a description for each base-runner (i.e., a batter on base), including, but not limited to, advancing to a next base, getting forced out on base, getting forced out by being tagged, getting tagged out, or others. In other examples, window 342 may be configured to receive an input associated with a description of a base-runner. Further, base-runner icon 348 may be initially placed on a portion of background 349 as determined from an input received using play result 314 (FIG. 3A) or others. Still further, base-runner icon 348 may be moved to another portion of background 349 based on another interaction (e.g., a mouse drag, a mouse-over, keystroke, voice command, or others). In another example, base-runner icon 347 may be moved simultaneously or substantially simultaneously to movement of base-runner icon 348.

In some examples, control 343 may be used to record an "out" (i.e., to retire a play) based on the description recorded for a particular base-runner involved in the play. Also, runner input 345 may be configured to transmit data entered by a user, as described above. In other examples, runner control 346 may be configured to provide a result that may modify positions for one, some, or all of base-runner icons 347-348 simultaneously or substantially simultaneously with each other in order to advance to a base or for a run. In some examples, display 341 may provide field 334 (FIG. 3C) that may be configured to present or display a scoreboard or page controls. Further, player information or icons may be presented as avatars (not shown) of various shapes, sizes, colors, designs, or other features. In some examples, an avatar may present data associated with player input 313 (FIG. 3A).

Figure 3E:
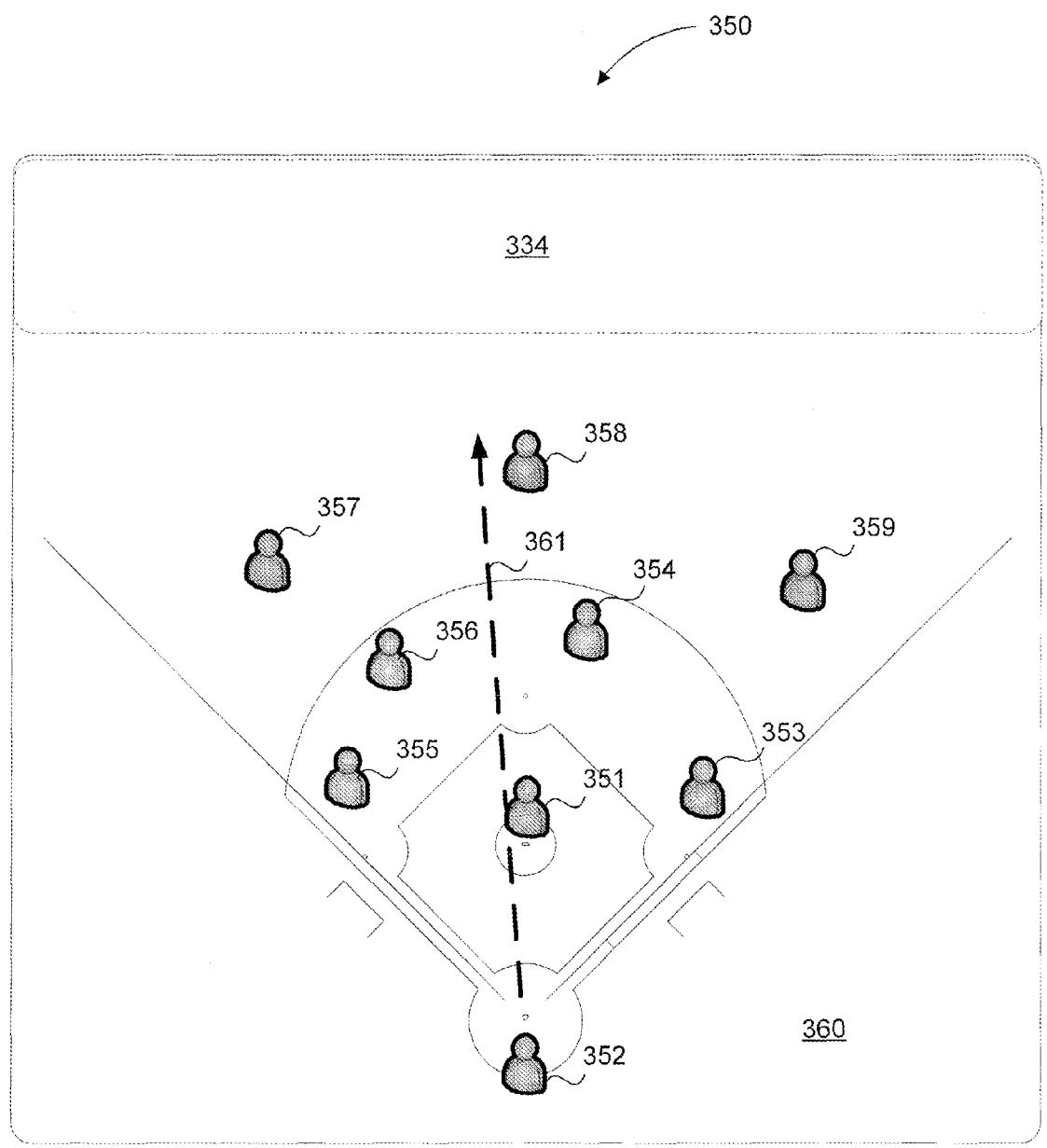
FIG. 3E illustrates an exemplary interactive scorekeeping and animation generation user interface.

FIG. 3E illustrates an exemplary interactive scorekeeping and animation generation user interface. Here, display 350 includes fielder icons 351-359, background 360, and hit path 361. In some examples, display 350 may be configured as an interface to receive an input associated with scoring of defensive plays. For example, each fielder icon may represent a player of the game playing defense. Also, each fielder icon may be configured to a numerical identifier, which may be included in scoring of the game. In some examples, each fielder icon may be accompanied by a position number, for example, fielder icon 351 may be assigned fielding position 1 (i.e., pitcher), whereas fielder icon 352 may be assigned fielding position 2 (i.e., catcher). A position number may be included in scoring to determine a sequence of animations to be generated, which may present a seamless stream of video used for animation output 304 (FIG. 3A) or others. In some examples, a position number may be configured to perform scoring. Display 350 may be configured to present hit path 361 to represent the path of a hit and the destination of the hit. In some examples, background 360 may be configured to include an image such as a baseball field, baseball diamond, cricket field, soccer field, football field, or others, as presented in association with other imagery (e.g., icons, buttons, or others), providing a map coordinating positions indicated by one or more of fielder icons 351-359. In still other examples, field 334 (FIG. 3C) may be configured on display 350 to present scoring information including page controls.

Figure 3F:
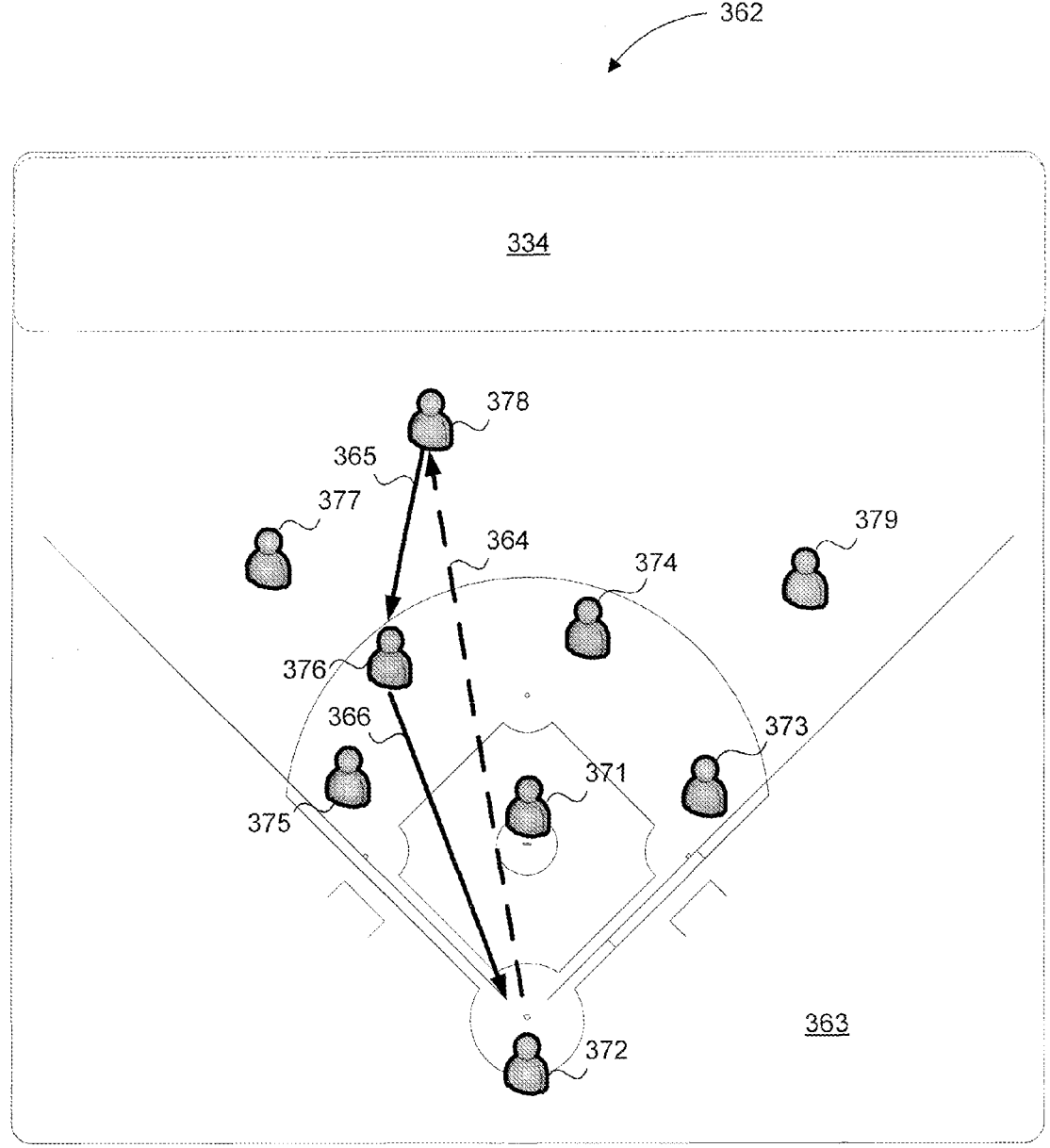
FIG. 3F illustrates another exemplary interactive scorekeeping and animation generation user interface.

FIG. 3F illustrates another exemplary interactive scorekeeping and animation generation user interface. Here, display 362 includes fielder icons 371-379, background 363, hit path 364, hit path 365, and hit path 366. In some examples, display 362 may be configured as an interface to receive an input associated with scoring defensive plays. In some examples, one or more of fielder icons 371-379 may be moved or repositioned to other portions of background 363 to represent a start and ending motion performed by a player (i.e., a player being represented as an avatar using one of fielder icons 371-379 or others), generating a defensive play animation (e.g., computer-generated video) of a sequence including, for example, fielder icon 378 (i.e., fielding position 8) running a ball down at left-center field and relaying the ball (e.g., hit path 365) to fielder icon 376 (i.e., fielding position 6) at shortstop, where fielder icon 376 relays the ball (e.g., hit path 366) to fielder icon 372 (i.e., fielding position 2) recording an "out." Further, fielding positions recorded for scoring may be compiled to form a tag that is used to generate a portion of animation output 304 (FIG. 3A). In still other examples, field 334 (FIG. 3C) may be used to present scoring information including page controls.

FIG. 3G illustrates an exemplary interactive score sheet. Here, score sheet 380 may be presented when invoked, for example, from interface 322 (FIG. 3B). When presented, various types of scoring data or information may be entered using fields 381-387. Types of data or information that may be entered include, but are not limited to, a player's number, name, position, substitute player names, and various types of statistics (e.g., AB—at bat, R—runs, H— hits, RBI—runs batted in, 2B—double, 3B—triple, HR—home run, K—strike, BB—walked ball, HBP—hit by pitch, SAC—sacrifice, SBA—stolen base attempts, SB—stolen bases, PA—play appearances, and others). Further, plays may be represented using at bat cells 388-397, which are described in greater detail below in connection with FIG. 3H. In other examples, score sheet 380 may be varied in design, layout, configuration, function, or implementation and is not limited to the examples shown and described.

Figure 3H:
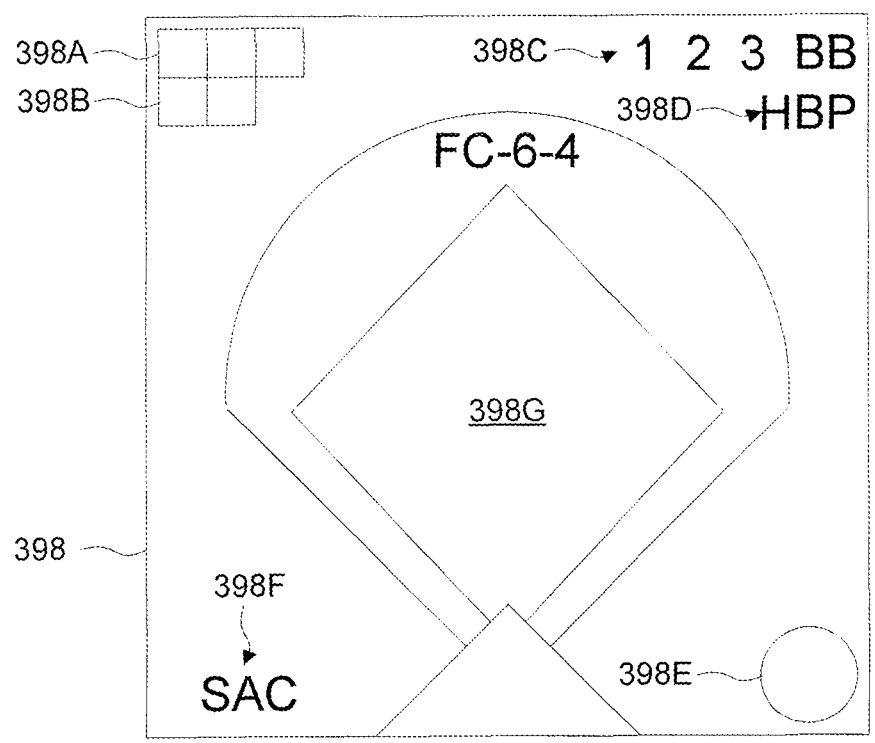
FIG. 3H illustrates an exemplary at bat cell configured to be presented on an interactive score sheet.

FIG. 3H illustrates an exemplary at bat cell configured to be presented on an interactive score sheet. Here, at bat cell 398 is shown, including ball cells 398A, strike cells 398B, statistics 398C-398D, out indicator 398E, or sacrifice indicator 398F. Field representation 398G may be configured to present a graphical summary of a given play for a player on an interactive score sheet, such as that shown and described above in connection with FIG. 3G. Referring back to FIG. 3H, when a runner gains a base, whether by a base hit, stealing a base, or otherwise, field representation may be graphically modified to reflect which base the runner is on by highlighting one of "1," "2," or "3" in statistics 398C. If a batter hits a pitch, "HBP" in statistics 398D may be highlighted. Further, additional statistics that describe a given play by particular players (e.g., "FC-6-4," and others) may be presented above field representation 398G. Still further, if a given batter is out, whether by striking out at bat or otherwise, out indicator 398E may be highlighted and a base number provided to indicate on which base the runner was struck out. Ball cells 398A and strike cells 398B may be highlighted to indicate whether any balls or strikes are assessed against a given player. In some examples, ball cells 398A and strike cells 398B may be filled in, shaded, or otherwise visually modified to indicate a quantitative score assessed against a given player. Data or information assessed against a given player during an inning may be presented in score sheet 380. In other examples, the above-described techniques may be varied and are not limited to the examples shown and described.

Figure 4A:
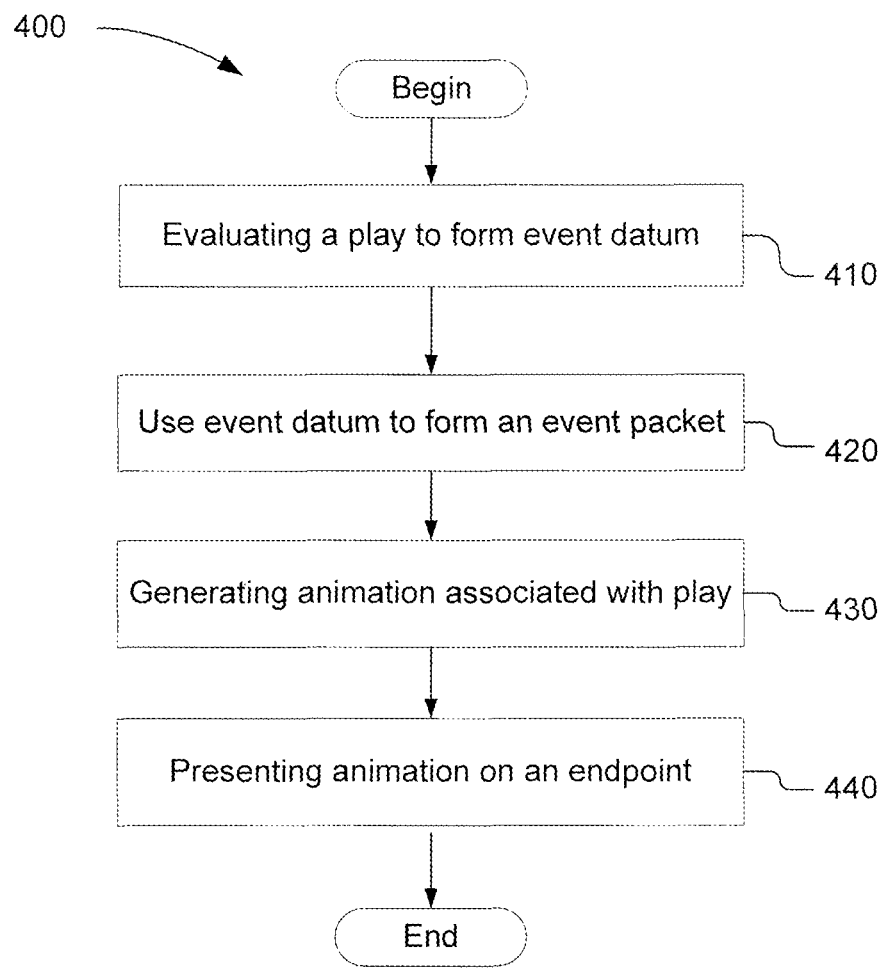
FIG. 4A illustrates an exemplary interactive scorekeeping and animation generation process.

FIG. 4A illustrates an exemplary interactive scorekeeping and animation generation process. Here, scorekeeper application 110 (FIG. 1) begins evaluating a play to form an event datum associated with execution of the play (410). In some examples, evaluating a play may include processing data associated with execution of the play. In other examples, evaluating a play may include recording a characteristic of an event associated with the play. In still other examples, evaluating a play may include generating a record of a game, for example, recording data of an event associated with an outcome of the play. In some examples, recording of data of an event may store a portion of an outcome of a play. Further, evaluating a play may include keeping score associated with the play. In some examples, using an event datum is used to form an event packet (420). In some examples, forming an event packet may include generating a result associated with execution of the play. For example, a result may be an output such as score sheets, charts, graphs, video, images, and other outputs associated with a record of a game. In other examples, using an event datum may include simultaneously or substantially simultaneously storing of an event packet at a server. In still other examples, using the event datum may include generating a web file (e.g., a computer-generated file, document, image, script, or other data structure that is used to transmit content over a data network and, when received, is processed to present and render content for viewing or interaction) to translate the event packet. Using the formed event packet, an animation is generated (430).

In some examples, generating an animation may include generating a control signal associated with an animation and sending the control signal to an animation engine that is configured to produce animations of plays or other events, as described above. As described herein, any type of animation engine may be used without limitation to any specific implementation. In other examples, generating an event packet may also include generating a control bit that is configured to activate the animation. In some examples, an animation may be associated with execution of a play. Once generated, an animation is presented on an endpoint (e.g., an endpoint may refer to various types of end devices, applications, software, hardware, desktop or notebook computers, servers, clients, personal digital assistants (PDAs), smart phones, or others, regardless of whether implemented in a wireless, wired, optical, or other type of public or private data communication or networking environment, including, but not limited to those shown and described above in connection with FIG. 1) (440). In other examples, presenting an animation may include a user accessing an animation from a device locally or remotely, which may also include rendering the animation locally. Further, presenting an animation may include accessing an animation sequence for playback. For example, an animation sequence (i.e., a sequence of animations, as described above) may include at least a portion of a game having one or more plays. An animation sequence may include execution of a play, such as a portion of a baseball game. An animation sequence may also be associated with a profile generated at an endpoint. In still other examples, presenting an animation may also include selecting a view angle of the animation from a group of view angles. Still further, the above-described process may be varied in implementation, order, execution, and design, and is not limited to the examples provided above.

Figure 4B:
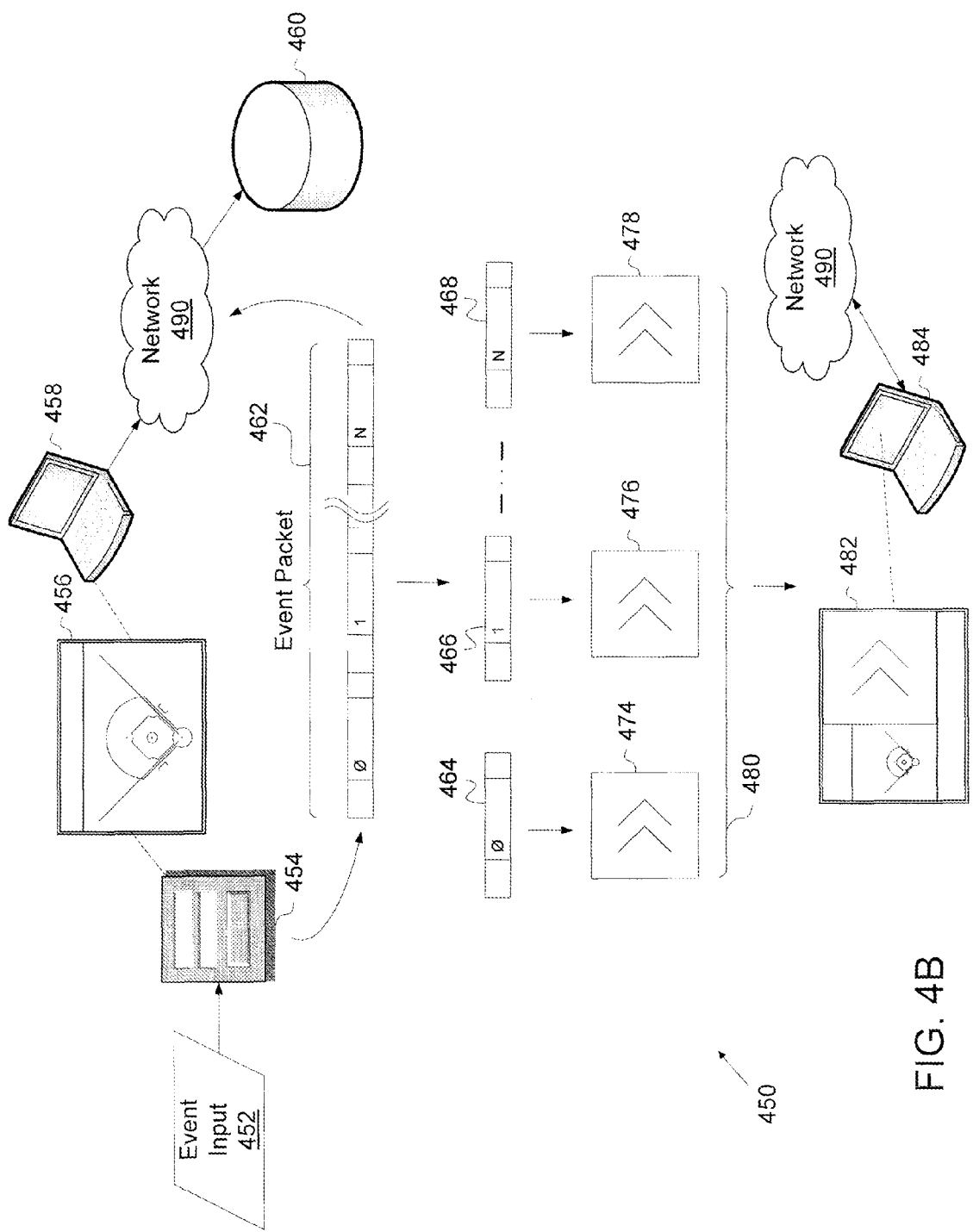
FIG. 4B illustrates an alternative exemplary interactive scorekeeping and animation generation process.

FIG. 4B illustrates an alternative exemplary interactive scorekeeping and animation generation process. Here, scorekeeper process 450 evaluates a play by receiving event input 452, which is associated with the play using data entered on input form 454. In some examples, scorekeeping application 456 processes event input 452 to form an event datum associated with execution of a play (e.g., a pitch thrown for a strike, and others). In other examples, evaluating a play may include recording a characteristic of an event associated with the play (e.g., a pitch thrown for a strike is identified and recorded as a fastball, and others). In still other examples, evaluating a play may include generating a record of a game, which may be transmitted over network 490 to repository 460 for storage.

In some examples, a record of a game may be, including but not limited to, a score of the game, highlights of each play, and others. Here, recording event input 452 may include storing a portion of an outcome of a play (e.g., saving scoring data (i.e., data related to a play in which one or more points are added or subtracted from a count) that is used, for example to record actions that are required to end a play). In other examples, score recording may be performed to keeping a running score of a given game. In other examples, recording event input 452 may include describing an event associated with an outcome of a play (e.g., a double-play, which may include three fielding events to generate a score and an animation of the play, and others). Further, evaluating event input 452 may include maintaining a record of a score associated with a play.

In some examples, scorekeeping application 456 and input form 454 may be used to generate an event datum (not shown). As an example, an event datum may be a unit of logic that includes processed data from scorekeeping application 456. In other examples, an event datum may be combined with other event datum to form event packet 462. Here, event packet 462 may include data in various fields or sections (e.g., header, payload, check sum, and others) that may be used to generate a result associated with the execution of a play. In other words, event packet 462 may be processed (i.e., parsed, handled, interpreted, and the like) by scorekeeping application 456 to generate electronic score sheets, charts, graphs, tables, profile pages, player statistics, or other output associated with the record of a game. In some examples, event packet 462 may be generated simultaneously or substantially simultaneously to storing a portion of event packet 462 at repository 460. In other examples, data stored in event packet 462 may be used to generate a web file that is associated with generating an animation. For example, translating event packet 462 may include identifying a control signal found in a portion of event packet 462. For example, control signal 464 may be configured as tag 0, which associates itself with animation 474. Also, control signal 466 may be configured as tag "1," which is associated with animation 476. Further, control signal 468 may be configured as tag "N," which is associated with animation 478. In some examples, combining animations 474-478 to generate animation sequence 480 may be a computer-generated video stream presented on endpoint 484. In other examples, generation of animation sequence 480 may be performed at endpoint 484 using scorekeeping application 482. In still other examples, generation of animation sequence 480 may be performed remotely using, for example, repository 460 or an external processor (not shown) coupled to network 490. Endpoint 484 may be in data connection with network 490 and have access to repository 460 using scorekeeping application 482 as a portal (e.g., a website) to the above-described techniques. Also, scorekeeping application 482 at endpoint 484 may be configured to modify presentation of animation sequence 480 by selecting different viewing angles (e.g., a first person view, third person view, bird's eye view, or others). Further, scorekeeping application 482 may be configured to provide audio data simultaneously or substantially simultaneously with presenting animation sequence 480 at endpoint 484. Further, the above-described process may be varied in implementation, order, execution, and design, and is not limited to the examples provided above.

Figure 4C:
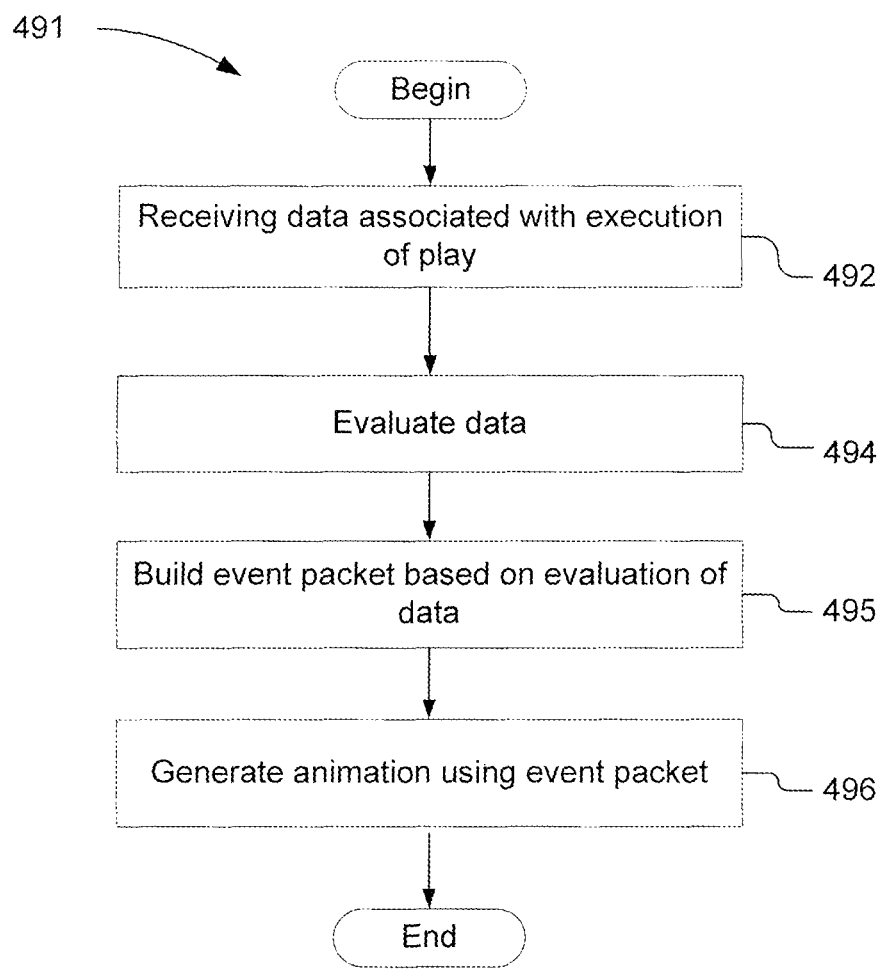
FIG. 4C illustrates another alternative exemplary interactive scorekeeping and animation generation process.

FIG. 4C illustrates another alternative exemplary interactive scorekeeping and animation generation process. Here, process 491 begins with receiving data associated with the execution of a play (492). After receiving data associated with the execution of the play, an evaluation is performed on the data (494). Based on the results of an evaluation, an event packet, as described herein, is built (495). Using one or more event packets built from data evaluated, as described above, one or more animations may be generated (496). In other examples, the above-described process may be varied in function, order, or operations, and is not limited to the examples shown and described.

Figure 5:
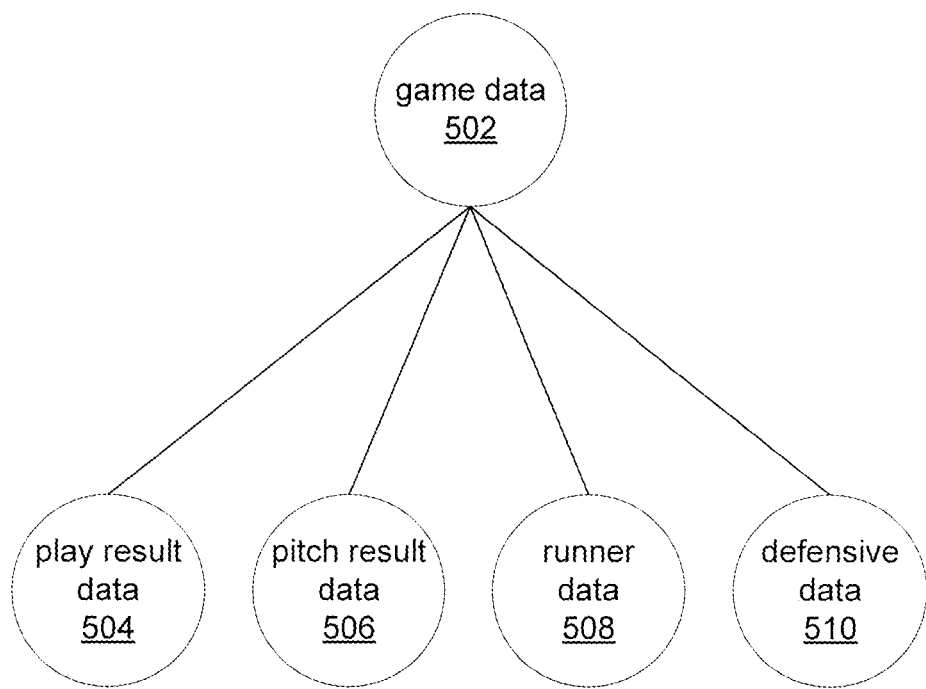
FIG. 5 illustrates exemplary types of game data.

FIG. 5 illustrates exemplary types of game data. Here, game data 502 may include, but is not limited to, play result data 504, pitch result data 506, runner data 508, and defensive data 510. Other types of data may be used with interactive scorekeeping and animation generation applications and techniques such as those described above. In some examples, play result data is collected when a play begins. For example, play result data 504 may include data or information that describes one or more details associated with a play (e.g., a strike based on a call or swing, a pitch called a ball, a hit called a foul, a runner getting on base, a play resulting in an out, runners advancing bases before or after a pitch, runners being called "out" before or after a pitch, a pick attempt, and others). Once a result of a play is determined, pitch result data 506 may be detected and recorded. In some examples, pitch result data 506 may include data or information that describes a pitch type, pitch speed, pitch location, or other attributes. In other examples, plays that involve base-running may be described using runner data 508 and, in some examples, play result data 504.

In some examples, runner data 508 may include data or information that describes which runners (i.e., players) are on a base (e.g., first base, second base, third base, or home plate), whether a runner has been called out or safe, whether a runner has advanced to a next base, whether a runner has scored, or whether a runner remains on base, and others. Likewise, defensive data 510 may include data or information that describes fielding activity. In some examples, defensive data 510 may include data or information that describes capturing motions or defensive actions. As an example, defensive actions may include putouts (i.e., a fielder performing an "out," retiring a play), assists (e.g., a relay between two fielders and one of the two fielders makes an out), and errors. Further, defensive data 510 may also include data or information that describes capturing motions by fielders (e.g., recording the path of a ball after a hit, catching a ball by a fielder). Still f game data 502 may be generated and presented in electronic or print output form, including but not limited to, a score sheet, a box score, a pitcher's chart, a hitting chart, a fielding chart, a set of graphs based on the charts, a statistical sheet based on the charts, and animation metadata. In other examples, game data 502 and the above-described examples may be varied and are not limited to the examples provided above.

Figure 6A:
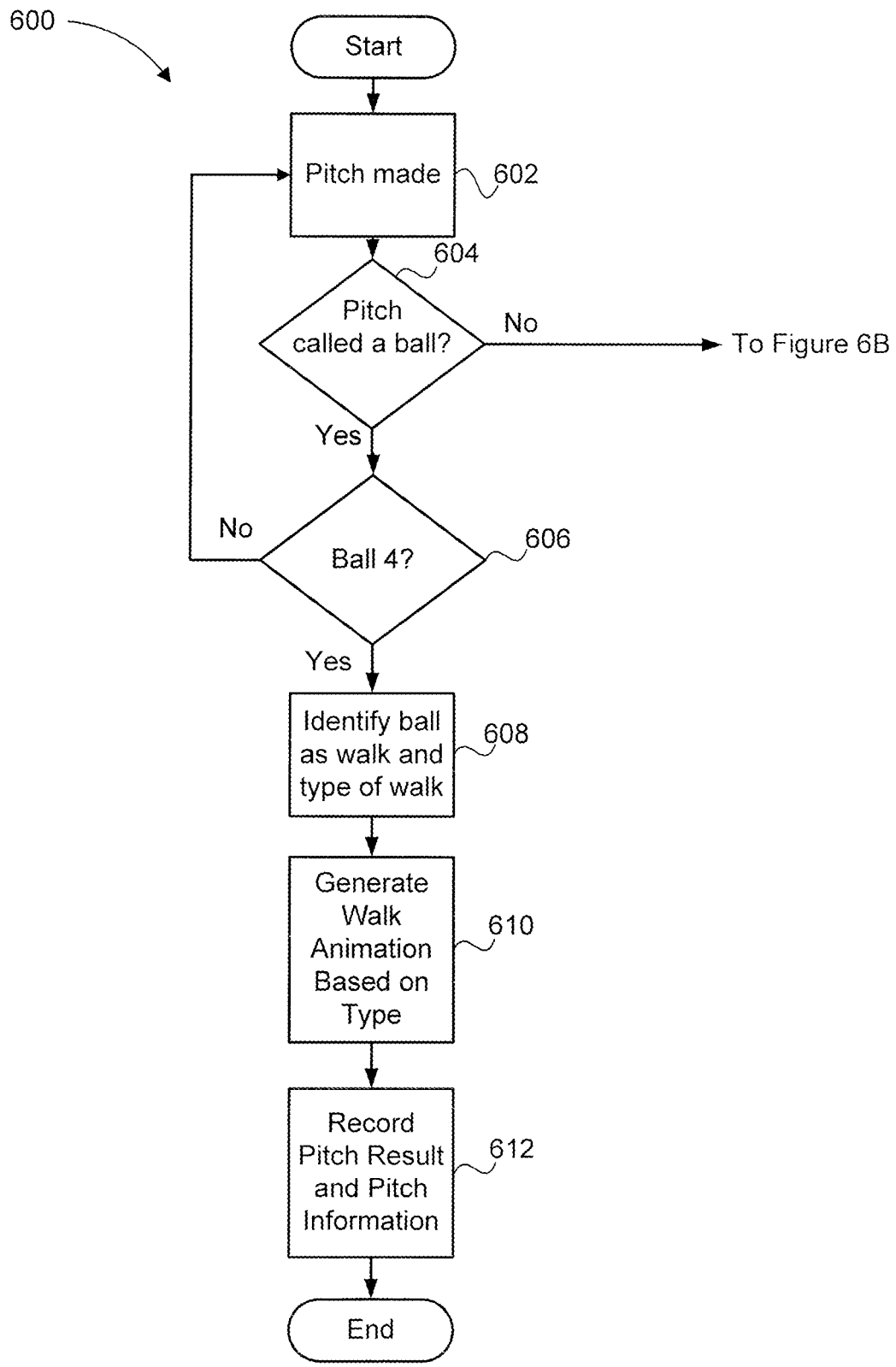
FIG. 6A illustrates an exemplary interactive scorekeeping and animation generation process.
Figure 6B:
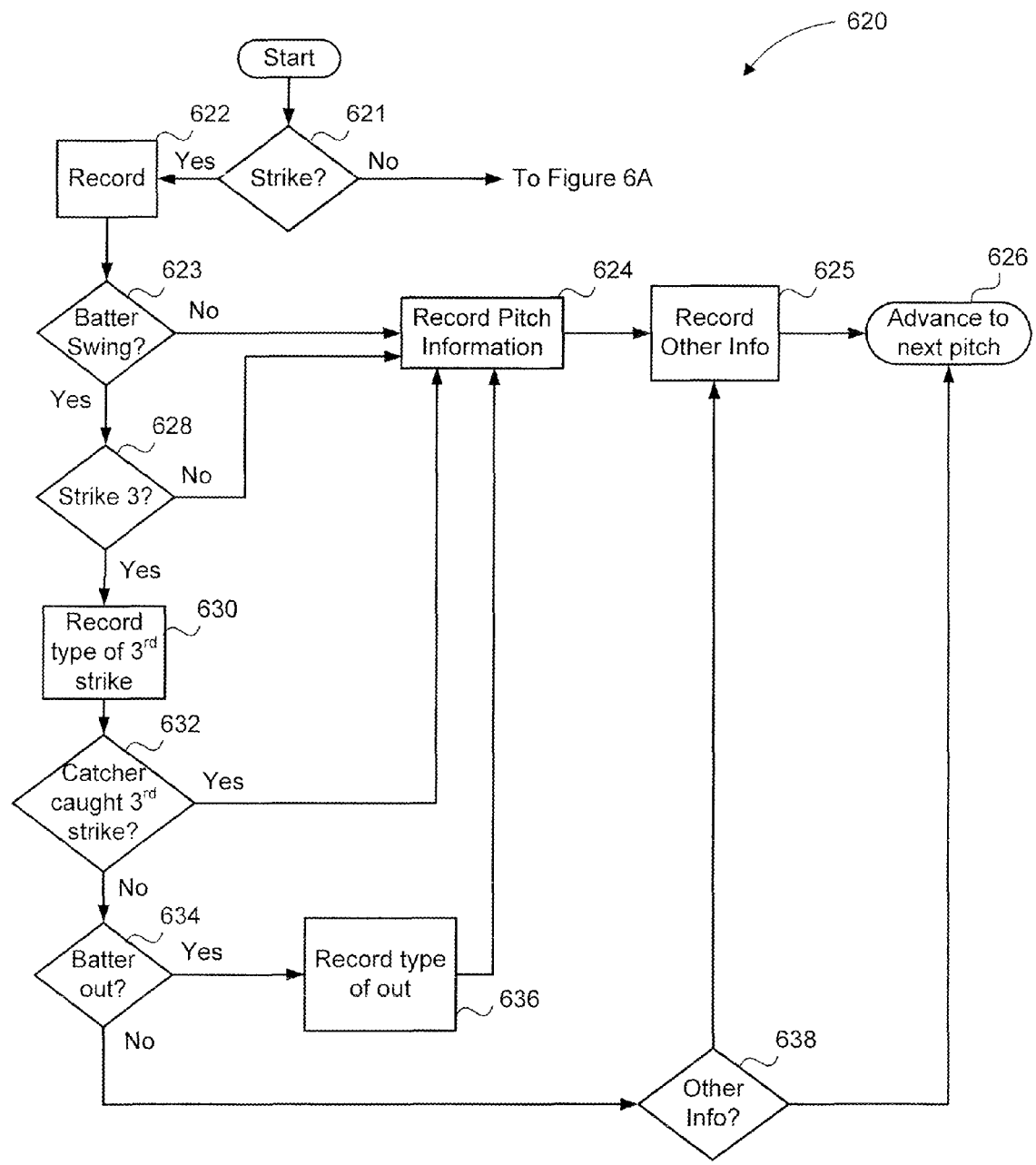
FIG. 6B illustrates another exemplary interactive scorekeeping and animation generation process.

FIG. 6A illustrates an exemplary interactive scorekeeping and animation generation process. Here, process 600 begins by a pitch being made (602). A determination is made as to whether a pitch is a ball (604). If a pitch is not a ball, then another process is performed to determine if the pitch was a strike (FIG. 6B). Referring back to FIG. 6A, if a pitch is called a "ball," then a determination is made as to whether the ball was the fourth ball called (606). If the ball was not the fourth ball called, then interactive scorekeeping and animation generation application 200 (FIG. 2A) or 250 (FIG. 2B) continues to evaluate pitches (602). If the pitch called was the fourth ball, then the ball is identified as a walk and a type of walk (608). Walk animation is generated based on the identified type of walk (610). After generating walk animation, pitch result data and pitch information is recorded (612). In other examples, the above-described process may be varied in implementation, order, execution, and design, and is not limited to the examples provided above.

FIG. 6B illustrates another exemplary interactive scorekeeping and animation generation process. Here, process 620 begins by evaluating a pitch to determine if a pitch is called a strike (621), if not then, a process is performed to determine if the pitch was a ball (FIG. 6A). Referring back to FIG. 6B, if a pitch is called a "strike," then pitch result data is recorded (622). A determination is made as to whether the batter swung at the pitch (623). If a determination is made that the batter did not swing at the pitch, then pitch information is recorded (624), other information other than pitch information is recorded (625), and the process advances the overall process (FIG. 6A) to a next pitch (626). Alternatively, if a batter did swing at a pitch, then a determination is made as to whether the pitch is strike "3" (i.e., considering the play retired) (624). If a strike is not strike "3," then pitch information is recorded (624), other information other than pitch information is recorded (625), and the process advances the overall process (FIG. 6A) to a next pitch (626). If the pitch was strike "3" (628), then the type of strike out (e.g., catcher (fielding position 2) catches the pitch, batter swings and strikes three times, a player in the outfield catches a hit, and others) is recorded (630). A determination is made as to whether a catcher caught a ball pitched and called a strike "3" (632). If the strike "3" is caught by a catcher, then pitch information is recorded (624), other information other than pitch information is recorded (625), and the process advances the overall process (FIG. 6A) to a next pitch (626). If the strike "3" is not caught, then a determination is made as to whether the batter has struck out (634). If the batter strikes out, then the type of "out" is recorded (636) and pitch information is recorded (624), other information other than pitch information is recorded (625), and the process advances the overall process (FIG. 6A) to a next pitch (626). Alternatively, if the batter does not strike out then a determination is made as to whether other play data or information exists regarding the batting attempt (638). If other data or information exists, then data or information other than pitch information is recorded (625) and the process advances the overall process (FIG. 6A) to a next pitch (626). In other examples, the above-described process may be varied in implementation, order, execution, and design, and is not limited to the examples provided above.

Figure 6C:
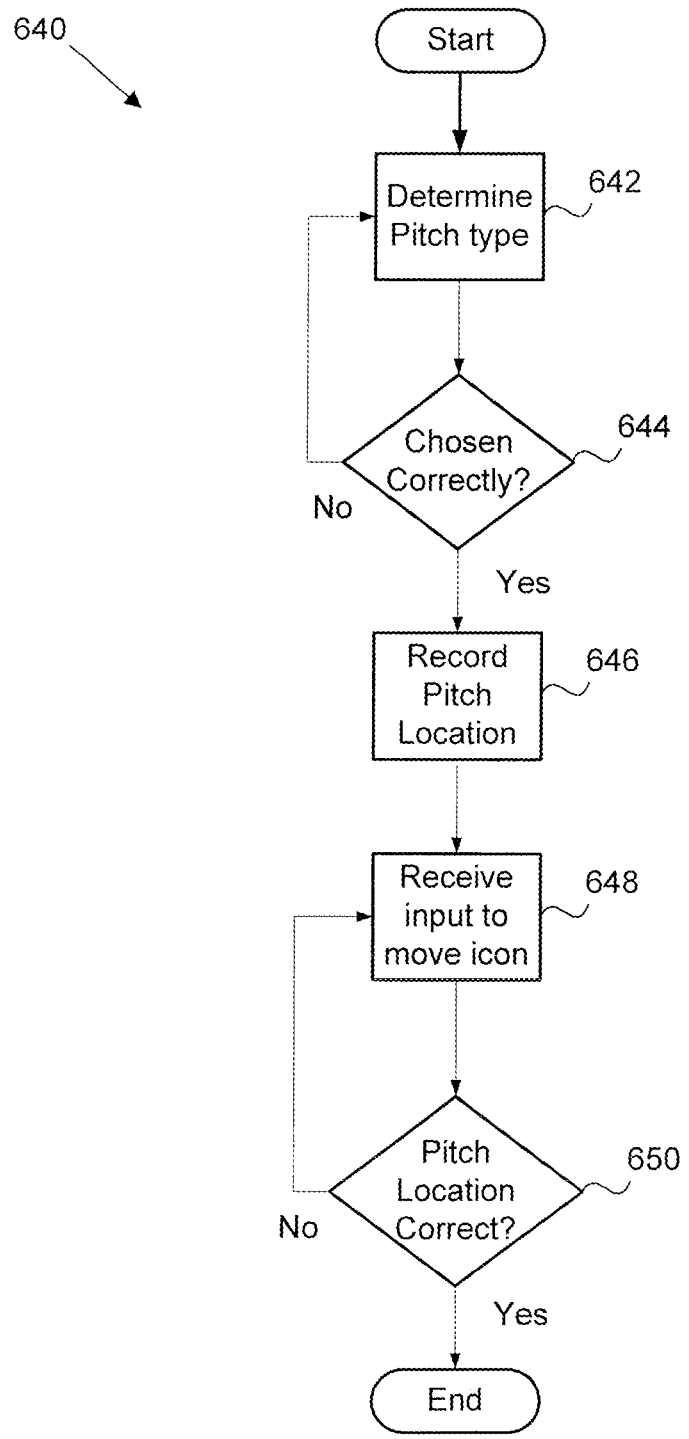
FIG. 6C illustrates still another exemplary interactive scorekeeping and animation generation process.

FIG. 6C illustrates still another exemplary interactive scorekeeping and animation generation process. Here, pitch type is determined (642). A determination is made as to whether the pitch type was chosen correctly (644). If the pitch type was not chosen correctly, then the determination is performed again. If the pitch type was chosen correctly, then pitch location data or information is recorded (646). Input (e.g., data or information) associated with movement of an icon representing, for example, an avatar or other symbol presented on a display provided by interactive scorekeeping and animation generation application 200 (FIG. 2A) or 250 (FIG. 2B) is received (648). A determination is made as to whether the pitch location is correct (650). If the pitch location is correct, then the process ends. Alternatively, if the pitch location is not correct, then the process repeats to await receiving input for movement of an icon, as described above. In other examples, the above-described process may be varied in implementation, order, execution, and design, and is not limited to the examples provided above.

Figure 6D:
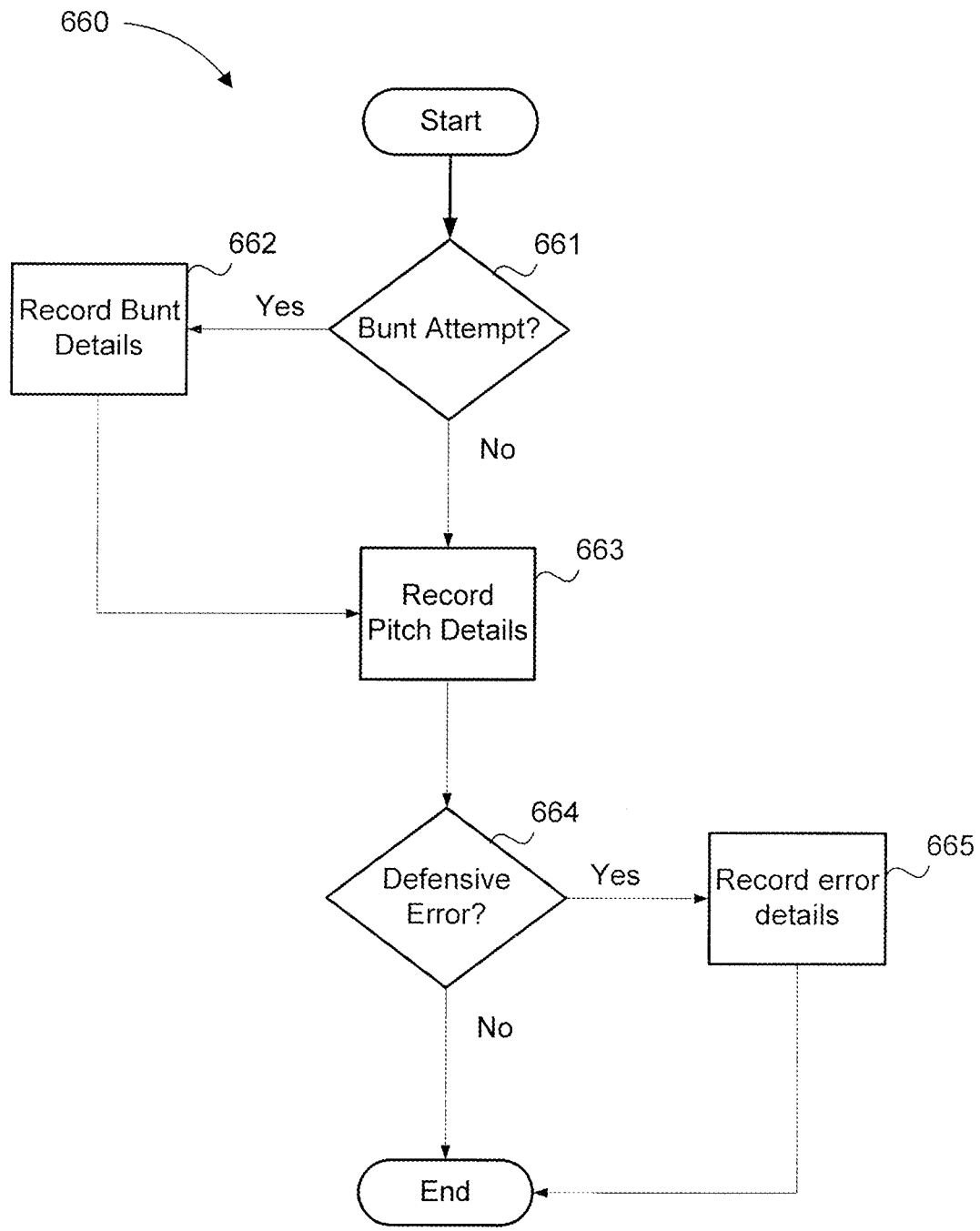
FIG. 6D illustrates a further exemplary interactive scorekeeping and animation generation process.

FIG. 6D illustrates a further exemplary interactive scorekeeping and animation generation process. Here, process 660 begins by making a determination as to whether a bunt attempt was made (661). In some examples, a bunt may be a technique used during batting to ground the ball in fair territory (i.e., a portion of the field where the ball lands and considered valid). If a bunt attempt was made, then details about the bunt attempt, including data or information associated with motions of the batter, are recorded (662). Regardless of whether a bunt attempt was performed, pitch details are recorded (663). After recording pitch details, a determination is made as to a defensive error occurred (664). If no defensive error occurred, then the process ends. If a defensive error did occur, then error details are recorded (665). In other examples, the above-described process may be varied in implementation, order, execution, and design, and is not limited to the examples provided above.

Figure 6E:
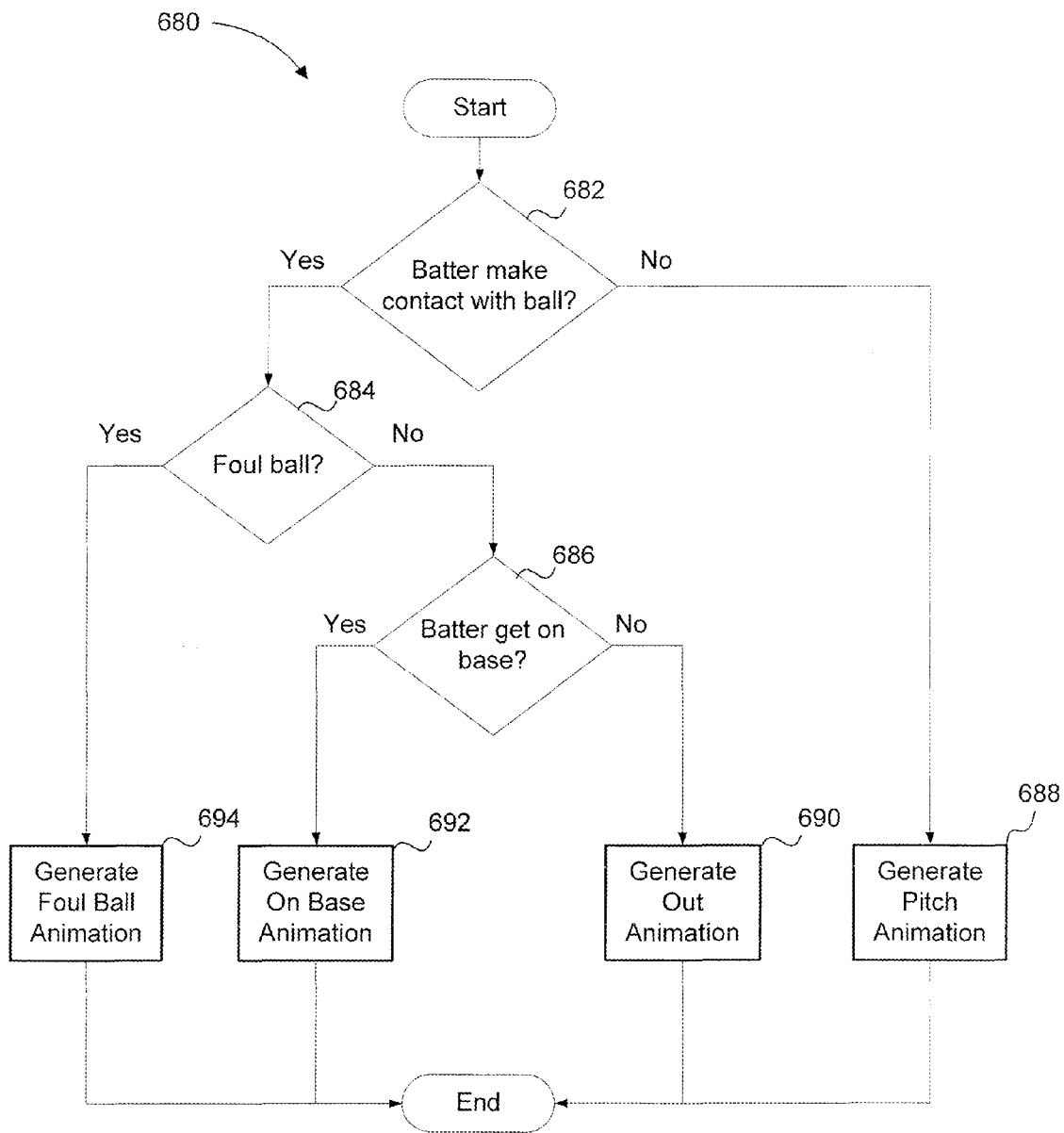
FIG. 6E illustrates yet another exemplary interactive scorekeeping and animation generation process.

FIG. 6E illustrates yet another exemplary interactive scorekeeping and animation generation process. Here, a determination is made as to whether a batter made contact with a ball (682). If a batter made contact with the ball, then another determination is made as to whether a foul ball occurred (684) and yet another determination as to whether the batter made it on base (686). If a batter did not make contact with a ball, then an animation depicting the pitch is generated (688). If a batter did not get on base, then an animation depicting an "out" is generated (690). If a batter did get on base, then an animation depicting a batter getting on base is generated (692). If a batter hit a foul ball, then an animation depicting a foul ball being hit is generated (694). Regardless, after generating animations (e.g., 688-694), the above-described process ends. In other examples, the above-described process may be varied in implementation, order, execution, and design, and is not limited to the examples provided above.

Figure 6F:
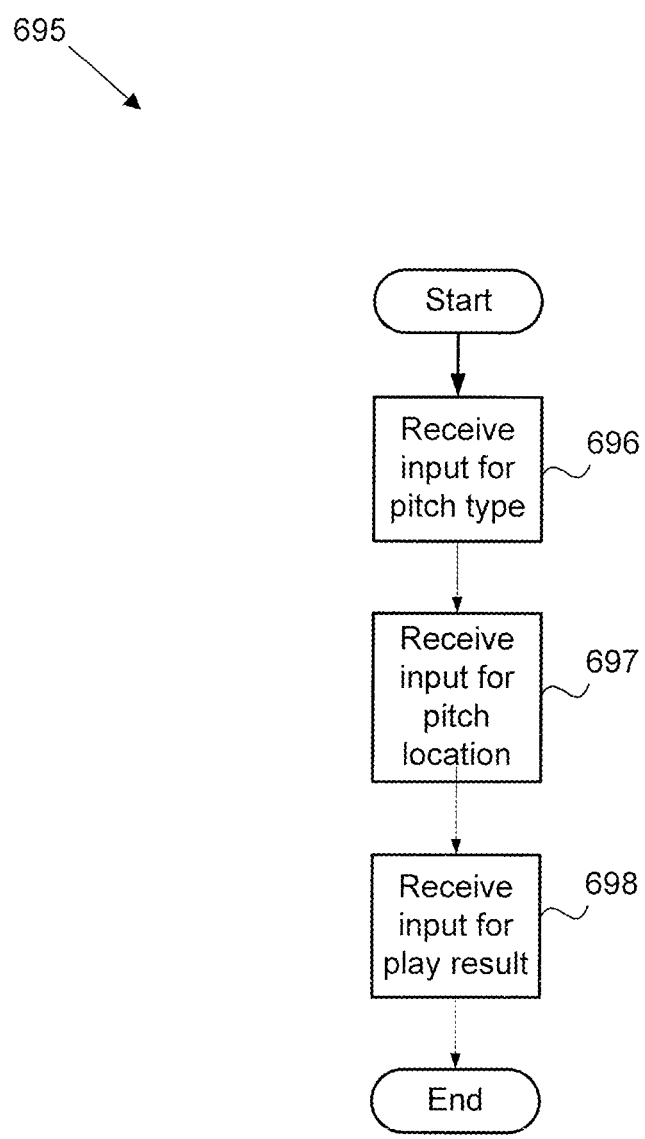
FIG. 6F illustrates an alternative exemplary interactive scorekeeping and animation generation process.

FIG. 6F illustrates an alternative exemplary interactive scorekeeping and animation generation process. Here, process 695 begins by receiving an input configured to indicate a pitch type (696). In some examples, an input may be received that is configured to indicate a pitch location (i.e., a location relative to a batter or player as to where a given pitch was placed, positioned, came across home plate, entered a strike zone, or the like) (697). Upon receiving a pitch type and a pitch location, another input configured to indicate a play result may be received (698). As an example, process 695 may be used to determine a play result associated with a given pitch during a baseball game. When a pitch type (e.g., fastball, curveball, slider, and others) and a location (e.g., inside, outside, middle, and others) are input using an interface (e.g., FIGS. 3A-3F), a play result (e.g., strike, hit, bunt, base hit, and others) may be determined by logic such as that described herein. In other examples, the above-described process may be varied and is not limited to the implementations described. For example, the above-described process may be used for various types of sports or activities and is not limited to baseball, softball, or the like.

In some examples, various types of user interfaces may be implemented and used to provide inputs such as those described above in connection with process 695. Interfaces such as those described above in connection with FIGS. 3A-3F may be used. In other examples, interfaces other than those described may be implemented.

Figure 7:
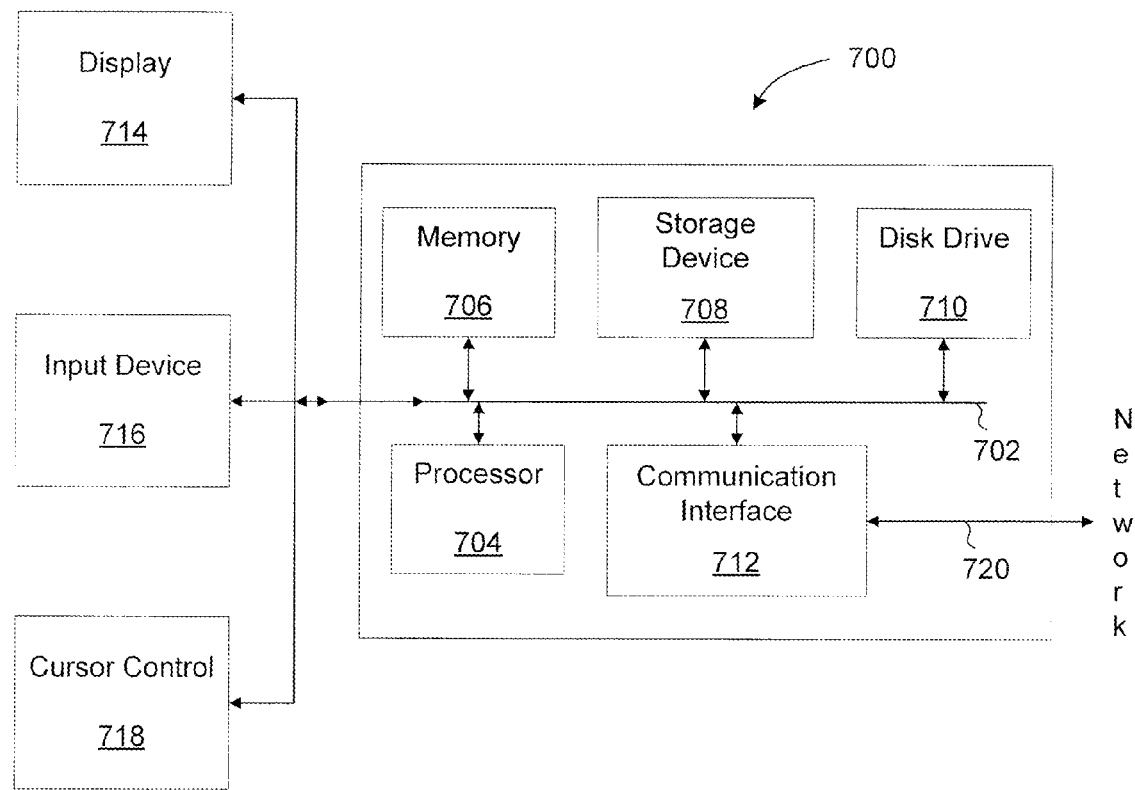
FIG. 7 illustrates an exemplary computer system suitable for interactive scorekeeping and animation generation.

FIG. 7 illustrates an exemplary computer system suitable for interactive scorekeeping and animation generation. In some examples, computer system 700 may be used to implement computer programs, applications, methods, processes, or other software to perform the above-described techniques. Computer system 700 includes a bus 702 or other communication mechanism for communicating information, which interconnects subsystems and devices, such as processor 704, system memory 706 (e.g., RAM), storage device 708 (e.g., ROM), disk drive 710 (e.g., magnetic or optical), communication interface 712 (e.g., modem or Ethernet card), display 714 (e.g., CRT or LCD), input device 716 (e.g., keyboard), and cursor control 718 (e.g., mouse or trackball).

According to some examples, computer system 700 performs specific operations by processor 704 executing one or more sequences of one or more instructions stored in system memory 706. Such instructions may be read into system memory 706 from another computer readable medium, such as static storage device 708 or disk drive 710. In some examples, hard-wired circuitry may be used in place of or in combination with software instructions for implementation.

The term "computer readable medium" refers to any medium that participates in providing instructions to processor 704 for execution. Such a medium may take many forms, including but not limited to, non-volatile media, volatile media, and transmission media. Non-volatile media includes, for example, optical or magnetic disks, such as disk drive 710. Volatile media includes dynamic memory, such as system memory 706. Transmission media includes coaxial cables, copper wire, and fiber optics, including wires that comprise bus 702 for transmitting a computer data signal.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 700. According to some examples, two or more computer systems 700 coupled by communication link 720 (e.g., LAN, PSTN, or wireless network) may perform the sequence of instructions in coordination with one another. Computer system 700 may transmit and receive messages, data, and instructions, including program, i.e., application code, through communication link 720 and communication interface 712. Received program code may be executed by processor 704 as it is received, and/or stored in disk drive 710, or other non-volatile storage for later execution.

Although the foregoing examples have been described in some detail for purposes of clarity of understanding, the invention is not limited to the details provided. There are many alternative ways of implementing the invention. The disclosed examples are illustrative and not restrictive.

What is claimed:

1. A method, comprising:
   receiving at a user interface, data indicating a location relative to a position of a player, data associated with a characteristic associated with execution of a play in a game and data associated with a setting associated with an animation sequence configured to be displayed as a video stream from a server to a display associated with the user interface, the video stream being played on the display when the animation sequence is selected, the data indicating the location including coordinates for an icon representing the location of a ball thrown in a direction including left, right, or center;
   generating an event packet based on the characteristic associated with the execution of the play, the event packet comprising a first tag associated with a first animation and a second tag associated with a second animation, the first tag and the second tag being control signals disposed as one or more data packets in the event packet, the control signals being evaluated to identify and select the animation sequence to be played as the video stream on the display;
   generating the animation sequence using the first animation and the second animation, the animation sequence being configured to be modified based on the setting associated with the animation sequence and also being configured to mark one or more frames of the animation sequence using one or more tags to determine one or more identified frames, the animation sequence being configured to be compiled successively using the one or more identified frames if a control signal is received from a scorekeeping application to initiate the successively compiling, and compiling the first animation and the second animation to form the animation sequence, the animation sequence being an animated representation of the play using one or more avatars and wherein the animated sequence is generated as the game is scored, the first animation and the second animation being compiled with one or more animations to form another animated representation of the game including presenting the icon based on the location, wherein the another animation representation is configured to be displayed using one or more modifiable viewing angles; and
   causing presentation of the animation sequence at an endpoint, the animation sequence comprising the avatar, the avatar representing a player in the game and configured to be displayed using the one or more modifiable viewing angles.

2. The method of claim 1, further comprising:
   updating a score of the game based on the characteristic associated with the execution of the play; and
   causing presentation of the animation sequence and the score at the endpoint.

3. The method of claim 1, further comprising:
   determining a result of the play based on the characteristic associated with the execution of the play; and
   causing presentation of another animation at the endpoint, the another animation associated with the result of the play.

4. The method of claim 1, wherein the setting associated with the animation sequence is associated with one or more of a characteristic of the avatar, an environmental condition, a team uniform to be displayed on the avatar, and a performance level of the avatar.

5. The method of claim 1, wherein presenting the icon based on the location is responsive to a pitch type.

6. The method of claim 5, wherein, the pitch type includes data representing at least one of a fastball, a change-up, a curve ball, a slider, and a splitter.

7. The method of claim 1, further comprising:
   moving the icon in the presentation of the animation sequence based on the location, wherein at least one modifiable viewing angle is relative to the position of the player having a first person view.

8. The method of claim 1, wherein the one or more modifiable viewing angles comprise a viewing angle in the third person.

9. The method of claim 1, wherein the one or more modifiable viewing angles comprise a viewing angle in the first person.

10. The method of claim 1, wherein the one or more modifiable viewing angles comprise a bird's eye view.

11. A system, comprising:
    a memory configured to store data indicating a location relative to a position of a player, data associated with a characteristic associated with execution of a play in a game received from a user interface and to store data associated with a setting associated with an animation sequence received from the user interface, the animation sequence being configured to be displayed as a video stream from a server to a display associated with the user interface, the video stream being played on the display when the animation sequence is selected, the data indicating the location including coordinates for an icon representing the location of a ball thrown in a direction including left, right, or center; and
    a processor configured to generate an event packet based on the characteristic associated with the execution of the play, the event packet comprising a first tag associated with a first animation and a second tag associated with a second animation, the first tag and the second tag being control signals disposed as one or more data packets in the event packet, the control signals being evaluated to identify and select the animation sequence to be played as the video stream on the display, to generate the animation sequence using the first animation and the second animation, the animation sequence being configured to be modified based on the setting associated with the animation sequence and also being configured to mark one or more frames of the animation sequence using one or more tags to determine one or more identified frames, the animation sequence being configured to be compiled successively using the one or more identified frames if a control signal is received from a scorekeeping application to initiate the successively compiling, and compiling the first animation and the second animation to form the animation sequence, the animation sequence being an animated representation of the play using one or more avatars and wherein the animated sequence is generated as the game is scored, the first animation and the second animation being compiled with one or more animations to form another animated representation of the game including presenting the icon based on the location, wherein the another animation representation is configured to be displayed using one or more modifiable viewing angles, and to cause presentation of the animation sequence at an endpoint, the animation sequence comprising the avatar, the avatar representing a player in the game and configured to be displayed using the one or more modifiable viewing angles.

12. The system of claim 11, wherein the processor is further configured to update a score of the game based on the characteristic associated with the execution of the play, and to cause presentation of the animation sequence and the score at the endpoint.

13. The system of claim 11, wherein the processor is further configured to determine a result of the play based on the characteristic associated with the execution of the play, and to cause presentation of another animation at the endpoint, the another animation associated with the result of the play.

14. The system of claim 11, wherein the setting associated with the animation sequence is associated with one or more of a characteristic of the avatar, an environmental condition, a team uniform to be displayed on the avatar, and a performance level of the avatar.

15. The system of claim 11, wherein presenting the icon based on the location is responsive to a pitch type.

16. The system of claim 15, wherein, the pitch type includes data representing at least one of a fastball, a change-up, a curve ball, a slider, and a splitter.

17. The system of claim 11, further comprising:
moving the icon in the presentation of the animation sequence based on the location, wherein at least one modifiable viewing angle is relative to the position of the player having a first person view.

18. The system of claim 11, wherein the one or more modifiable viewing angles comprise a viewing angle in the third person.

19. The system of claim 11, wherein the one or more modifiable viewing angles comprise a viewing angle in the first person.

* * * * *